United States Patent [19]
Davidson et al.

[11] Patent Number: 5,632,003
[45] Date of Patent: May 20, 1997

[54] COMPUTATIONALLY EFFICIENT ADAPTIVE BIT ALLOCATION FOR CODING METHOD AND APPARATUS

[75] Inventors: Grant A. Davidson, Oakland; Craig C. Todd, Mill Valley; Mark F. Davis, Pacifica; Brian D. Link, Oakland; Louis D. Fielder, Millbrae, all of Calif.

[73] Assignee: Dolby Laboratories Licensing Corporation, San Francisco, Calif.

[21] Appl. No.: 145,975

[22] Filed: Nov. 1, 1993

Related U.S. Application Data

[63] Continuation-in-part of Ser. No. 92,269, Jul. 16, 1993.
[51] Int. Cl.$^6$ ............................................. G10L 9/00
[52] U.S. Cl. .................................. 395/2.38; 395/2.39
[58] Field of Search ........................ 395/2, 2.1, 2.14, 395/2.2, 2.35–2.39; 381/29, 30, 34, 35; 364/724.01–724.2

[56] References Cited

U.S. PATENT DOCUMENTS

| | | | |
|---|---|---|---|
| 4,868,867 | 9/1989 | Davidson et al. | 395/2.32 |
| 4,956,871 | 9/1990 | Swaminathan | 395/2.38 |
| 5,185,800 | 2/1993 | Mahieux | 395/2.38 |
| 5,280,532 | 1/1994 | Shenoi et al. | 381/42 |
| 5,285,498 | 2/1994 | Johnston | 395/2.39 |
| 5,327,137 | 7/1994 | Scheerer | 341/168 |
| 5,381,512 | 1/1995 | Holton et al. | 395/2.41 |

FOREIGN PATENT DOCUMENTS

| | | |
|---|---|---|
| 0217017 | 4/1987 | European Pat. Off. . |
| 0376553 | 7/1990 | European Pat. Off. . |
| 0531538 | 3/1993 | European Pat. Off. . |
| 9217884 | 10/1992 | WIPO . |

OTHER PUBLICATIONS

Davidson et al., "High–Quality Audio Transform Coding at 128 kbits/s," ICASSP '90, Apr. 3–6, 1990, pp. 1117–1120.
Perkins et al., "A Psychophysically Justified Bit Allocation Algorithm for Subband Image Coding Systems," ICASSP '89, May 23–26, 1989, pp. 1815–1818.
PCT Search Report for PCT/US94/08015.
Mahieux, et al.; "Transform Coding of Audio Signals at 64 kBit/s," *Proc. IEEE GLOBECOM*, Dec. 1990, vol. 2, pp. 518–522.

(List continued on next page.)

*Primary Examiner*—Allen R. MacDonald
*Assistant Examiner*—Michael A. Sartori
*Attorney, Agent, or Firm*—Thomas A. Gallagher; David N. Lathrop

[57] ABSTRACT

The invention relates in general to low bit-rate encoding and decoding of information such as audio information. More particularly, the invention relates to computationally efficient adaptive bit allocation and quantization of encoded information useful in high-quality low bit-rate coding systems.

In one embodiment, an audio split-band encoder splits an input signal into frequency subband signals, quantizes the subband signals according to values established by an allocation function, and assembles the quantized subband signals into an encoded signal. The allocation function establishes allocation values in accordance with psychoacoustic principles based upon a masking threshold. The masking threshold is established by estimating the power spectral density (PSD) of the input signal, generating an excitation pattern by applying a spreading function to the PSD, adjusting the excitation pattern by an amount equal to a signal-to-noise ratio (SNR) offset sufficient to achieve psychoacoustic masking, comparing the level of the adjusted pattern to the threshold of hearing and generating a masking threshold which is equal to the larger of the two. The spreading function may be implemented by applying one or more IIR filters to the input signal PSD.

44 Claims, 13 Drawing Sheets

OTHER PUBLICATIONS

"Coding of Moving Pictures and Associated Audio for Digital Storage Media at Up to About 1.5 Mbit/s," ISO/IEC JTCI/SC29, 1992, pp. 2 and D–19 to D–24.

"ASPEC: ISO–MPEG Audio Coding Algorithm Submission", 1989, 1990.

Crochiere, et al,; "Frequency Domain Techniques for Speech Coding," *J. Acoust. Soc. Am.*, Dec. 1979, pp. 1642–1646.

Schroeder, et al.; "Optimizing Digital Speech Coders by Exploiting Masking Properties of the Human Ear," *J. Acoust. Soc. Am.*, Dec. 1979, pp. 1647–1652.

Jayant, et al,; *"Digital Coding of Waveforms,"* 1984, pp. 524–535.

Sekey, et al.; "Improved 1–Bark Bandwidth Auditory Filter," *J. Acoust. Soc. Am.*, Jun. 1984, pp. 1902–1904.

Johnston; "Transform Coding of Audio Signals Using Perceptual Noise Criteria," *IEEE J. on Selected Areas in Comm.*, Feb. 1988, pp. 314–323.

Johnston; "Estimation of Perceptual Entropy Using Noise Masking Criteria," *Int. Conf. Acoust., Speech and Signal Proc.*, Sep. 1988, pp. 2524–2527.

Sen, et al.; "Use of an Auditory Model to Improve Speech Coders," *Int. Conf. Acoust., Speech and Signal Proc.*, Apr. 1993, vol. II, pp. 411–414.

COMPUTATIONALLY EFFICIENT ADAPTIVE BIT ALLOCATION FOR CODING METHOD AND APPARATUS

CROSS-REFERENCE INFORMATION

This application is a continuation-in-part of copending application Ser. No. 08/092,269 filed Jul. 16, 1993.

Technical Field

The invention relates in general to low bit-rate encoding and decoding of information such as audio information. More particularly, the invention relates to computationally efficient adaptive bit allocation and quantization of encoded information useful in high-quality low bit-rate coding systems.

BACKGROUND

There is considerable interest among those in the fields of audio- and video-signal processing to minimize the amount of information required to represent a signal without perceptible loss in signal quality. By reducing information requirements, signals impose lower information capacity requirements upon communication channels and storage media.

Analog signals which have been subject to audio compression or dynamic range reduction, for example, impose lower information capacity requirements than such signals without compression. Digital signals encoded with fewer binary bits impose lower information capacity requirements than coded signals using a greater number of bits to represent the signal. Of course, there are limits to the amount of reduction which can be realized without degrading the perceived signal quality. Much of the following discussion is directed more particularly to digital techniques, but it should be realized that corresponding considerations apply to analog techniques as well.

The number of bits available for representing each sample of a digital signal establishes the accuracy of the digital signal representation. Lower bit rates mean that fewer bits are available to represent each sample; therefore, lower bit rates imply greater quantizing inaccuracies or quantizing errors. In many applications, quantizing errors are manifested as quantizing noise, and if the errors are of sufficient magnitude, the quantizing noise will degrade the subjective quality of the coded signal.

Various "split-band" coding techniques attempt to reduce information requirements without any perceptible degradation by exploiting various psycho-perceptual effects. In audio applications, for example, the human auditory system displays frequency-analysis properties resembling those of highly asymmetrical tuned filters having variable center frequencies and bandwidths that vary as a function of the center frequency. The ability of the human auditory system to detect distinct tones generally increases as the difference in frequency between the tones increases; however, the resolving ability of the human auditory system remains substantially constant for frequency differences less than the bandwidth of the above mentioned filters. Thus, the frequency-resolving ability of the human auditory system varies according to the bandwidth of these filters throughout the audio spectrum. The effective bandwidth of such an auditory filter is referred to as a "critical band." A dominant signal within a critical band is more likely to mask the audibility of other signals anywhere within that critical band than it is likely to mask other signals at frequencies outside that critical band. See generally, the *Audio Engineering Handbook*, K. Blair Benson ed., McGraw-Hill, San Francisco, 1988, pages 1.40–1.42 and 4.8–4.10.

Audio split-band coding techniques which divide the useful signal bandwidth into frequency bands with bandwidths approximating the critical bands of the human auditory system can better exploit psychoacoustic effects than wider band techniques. Such split-band coding techniques, in concept, generally comprise dividing the signal bandwidth with a filter bank, reducing the information requirements of the signal passed by each filter band such that signal degradation is just inaudible, and reconstructing a replica of the original signal with an inverse process. Two such techniques are subband coding and transform coding. Subband and transform coders can reduce information requirements in particular frequency bands where the resulting artifacts are psychoacoustically masked by one or more spectral components and, therefore, do not degrade the subjective quality of the encoded signal.

Subband coders may use any of various techniques to implement a filter bank with analog or digital filters. In digital subband coders, an input signal comprising signal samples is passed through a bank of digital filters. Each subband signal passed by a respective filter in the filter bank is downsampled according to the bandwidth of that subband's filter. The coder attempts to quantize each subband signal using just enough bits to render the quantizing noise inaudible. Each subband signal comprises samples which represent a portion of the input signal spectrum.

Transform coders may use any of various so-called time-domain to frequency-domain transforms to implement a bank of digital filters. Individual coefficients obtained from the transform, or two or more adjacent coefficients grouped together, define "subbands" having effective bandwidths which are sums of individual transform coefficient bandwidths. The coefficients in a subband constitute a respective subband signal. The coder attempts to quantize the coefficients in each subband using just enough bits to render the quantizing noise inaudible.

Throughout the following discussion, the term "split-band coder" shall refer to subband coders, transform coders, and other split-band coding techniques which operate upon portions of the useful signal bandwidth. The term "subband" shall refer to these portions of the useful signal bandwidth, whether implemented by a true subband coder, a transform coder, or other technique.

As discussed above, many digital split-band coders utilizing psychoacoustic principles provide high-quality coding at low bit rates by applying a filter bank to an input signal to generate subband information, quantizing each element of subband information using a number of bits allocated to that element such that resulting quantizing noise is inaudible due to psychoacoustic masking effects, and assembling the quantized information into a form suitable for transmission or storage.

A complementary digital split-band decoder recovers a replica of the original input signal by extracting quantized information from an encoded signal, dequantizing the quantized information to obtain subband information, and applying an inverse filter bank to the subband information to generate the replica of the original input signal.

The number of bits allocated to quantize each element of subband information must be available to the decoder to permit accurate dequantization of the subband information. A "forward-adaptive" encoder uses an allocation function to establish allocation values and explicitly passes these allocation values as "side information" to a decoder. A "backward-adaptive" encoder establishes allocation values by applying an allocation function to selected information and passes the selected information in the encoded signal rather than explicitly passing the allocation values. A backward-adaptive decoder reestablishes the allocation values by applying the allocation function to the selected information which it extracts from the encoded signal.

Generally speaking, complex allocation functions based upon sophisticated psycho-perceptual models are able to establish allocation values which achieve equivalent subjective coding quality at lower bit rates than the allocation values established by less complex allocation functions based upon simpler models. It is desirable, therefore, to use allocation functions based upon models which are as sophisticated as can be implemented practically.

One fairly sophisticated mathematical model of the mechanics of human hearing is described by Schroeder, Atal and Hall, "Optimizing Digital Speech Coders by Exploiting Masking Properties of the Human Ear," *J. Acoust. Soc. Am.*, December 1979, pp. 1647–1652. The model comprises (1) performing a short-time spectral analysis of an input signal by applying a short-time Fourier transform, (2) obtaining the input signal critical-band densities by mapping the resulting spectral coefficients into critical bands $\chi$, and (3) generating a basilar-membrane "excitation pattern" by convolving the critical band densities with a basilar membrane "spreading function." This model is applied to the input signal and to a noise signal representing quantizing errors to generate a "signal excitation pattern" and a "noise excitation pattern," respectively. The loudness of the input signal and the noise signal are calculated by integrating functions of the respective excitation patterns. The loudness of the input signal and the noise signal whose excitation pattern falls below a masking threshold is zero; that is, it is inaudible. The masking function is obtained from the product of the signal excitation pattern and a "sensitivity function" which defines the threshold of masking. An objective measure of coding performance is a ratio obtained by dividing the loudness of the noise signal by the loudness of the input signal. The mathematical model is straightforward and provides reasonably good results for spectral energy below about 5 kHz, but it is computationally intensive.

In one embodiment of a backward-adaptive encoder/decoder system, an encoder prepares an estimate of the input signal spectral envelope, establishes allocation values by applying an allocation function to the envelope estimate, scales signal information using elements of the envelope estimate as scale factors, quantizes the scaled signal information according to the established allocation values, and assembles the quantized information and the envelope estimate into an encoded signal. A backward-adaptive decoder extracts the envelope estimate and quantized information from the encoded signal, establishes allocation values by applying to the envelope estimate the same allocation function as that used by the encoder, dequantizes the quantized information, and reverses the scaling of the signal information. Scaling is used to increase the dynamic range of information which can be represented by the limited number of bits available for quantizing. Two examples of a backward-adaptive encoder/decoder system are disclosed in U.S. Pat. Nos. 4,790,016 and 5,109,417, which are incorporated herein by reference in their entirety.

Backward-adaptive techniques are attractive in many low bit-rate coding systems because no bits are required to pass explicit allocation values. The decoder recreates the allocation values by applying an allocation function to information extracted from the encoded signal.

Unfortunately, a backward-adaptive decoder must use an allocation function which is identical, or at least exactly equivalent, to that utilized by the encoder, otherwise accurate dequantization in the decoder is not guaranteed. As a result, the complexity or implementation cost of the decoder is similar to that of the encoder. Any restriction upon decoder complexity usually imposes restrictions upon the complexity of the allocation function in both the encoder and decoder, thereby limiting overall performance of the encoder/decoder system. Because of practical considerations in the decoder, many backward-adaptive coding systems cannot utilize allocation functions based upon computationally intensive models such as that described by Schroeder, et al.

Forward-adaptive techniques are attractive in many high-quality coding systems because the decoder does not need to perform an allocation function to establish allocation values. A forward-adaptive decoder can be computationally less complex and need not impose any restrictions upon the allocation function performed by the encoder. In addition, improved allocation functions may be incorporated into the encoders of forward-adaptive coding systems while maintaining compatibility with existing decoders. The allocation function used in an encoder can be the result of an independent design choice.

The ability to improve the allocation function in an encoder is significant. As advances are made in the arts of signal coding and signal processing, increasingly sophisticated allocation functions become economically practical. By increasing the sophistication of allocation functions, bit rates may be decreased for a given signal quality, or signal quality may be increased for a given bit rate.

Despite this advantage, however, forward-adaptive coding systems may be unsuitable in many low bit-rate applications because they require a significant number of bits to convey side information. Generally, even more bits are required to convey side information as allocation functions seek to improve coding performance by dividing the spectrum into narrower, and therefore more numerous, bands. Furthermore, the number of bits required to carry this side information will represent a larger proportion of the coded signal as improved coding techniques decrease the number of bits required to carry the remainder of the coded signal.

There is, therefore, a desire to develop efficient allocation functions based upon more sophisticated models which are suitable for low-cost implementation of coding systems, and for allowing future improvements in allocation functions without incurring extensive overhead in the encoded signal to carry explicit allocation values.

DISCLOSURE OF INVENTION

It is an object of the present invention to provide an efficient, high-performance allocation function suitable for use in low bit-rate high-quality encoding/decoding systems.

It is another object of the present invention to provide for an encoding/decoding system in which the allocation function in an encoder may be changed without incurring extensive overhead in the encoded signal to carry explicit allocation values.

According to the teachings of the present invention in a first embodiment of an audio encoder, an input signal is split into a plurality of subbands to generate subband information, the subband information is quantized according to allocation values established by an allocation function, and the quantized subband information is assembled into an encoded signal suitable for transmission or storage. The allocation function establishes allocation values in accordance with psychoacoustic principles based upon a masking threshold. The masking threshold is established by estimating the power spectral density (PSD) of the input signal, generating an excitation pattern by applying a spreading function to the PSD, adjusting the excitation pattern by an amount equal to a frequency dependent signal-to-noise ratio (SNR) offset sufficient to achieve psychoacoustic masking, comparing the level of the adjusted pattern to the threshold of hearing and generating a masking threshold which is equal to the larger of the two.

In backward-adaptive coding systems, the PSD is estimated from information which is also assembled into the encoded signal. For example, the PSD can be estimated from scaling factors derived from a spectral envelope. In forward-adaptive coding systems, the PSD may be estimated from information which is and/or is not assembled into the encoded signal. For example, the PSD can be estimated from a high-resolution spectral envelope of the input signal even though the high-resolution envelope is not included in the encoded signal.

In a particular implementation, subband information is quantized by using a quantizer selected from a set of quantizers. The quantizers in the set may differ from one another in the number of quantizing levels, use of a symmetric or asymmetric quantization function, use of a linear or non-linear quantization function, use and amplitude of pre-quantizing dither, and/or use of a reserved "small-zero" quantizing level for small amplitude signals. Additional details concerning the small-zero quantizing level may be obtained from U.S. patent application Ser. No. 07/981,286, which is incorporated herein by reference in its entirety.

In another implementation, the allocation values for subband information are established in response to the difference between the subband information amplitude and a respective portion of the masking threshold. The allocation values for subband information may be established in proportion to this difference and/or are established from a lookup table.

In yet another implementation, an excitation pattern is generated by applying one or more filters to subband information in the frequency domain. These filters may be implemented by recursive or Infinite Impulse Response (IIR) techniques, or by non-recursive or Finite Impulse Response (FIR) techniques. The use of either technique is not critical to the practice of the present invention.

According to the teachings of the present invention in a second embodiment of an encoder, one or more parameters affecting the results of the allocation function are modified in response to characteristics detected in either the input signal and/or the subband information. For example, the SNR offset mentioned above can be modified to affect overall coding quality. Side information comprising an indication of the modified parameters is assembled into the encoded signal.

In another implementation of the second embodiment, modified allocation values resulting from the use of modified parameters are assembled into the encoded signal as explicit allocation values.

Further embodiments of an encoder according to the teachings of the present invention are possible, including, but not limited to, an embodiment which incorporates a combination of the two embodiments described above. Furthermore, various combinations of the particular implementations described above are possible.

According to the teachings of the present invention in a first embodiment of an audio decoder, quantized subband information is extracted from an encoded signal, the quantized subband information is dequantized according to allocation values established by an allocation function, and an output signal is generated in response to the dequantized subband information. The allocation function establishes allocation values in accordance with psychoacoustic principles based upon a masking threshold. The masking threshold is established by obtaining an estimate of the PSD of the original input signal represented by the encoded signal, generating an excitation pattern by applying a spreading function to the PSD, adjusting the excitation pattern by an amount equal to a SNR offset sufficient to achieve psychoacoustic masking, comparing the level of the adjusted pattern to the threshold of hearing and generating a masking threshold which is equal to the larger of the two.

In backward-adaptive coding systems, the PSD may be estimated from measures of subband information amplitude and/or power which are extracted from the encoded signal. In forward-adaptive coding systems, however, decoders generally do not use any allocation function because explicit allocation values are passed in the encoded signal.

Features of the implementations discussed above for the first embodiment of an audio encoder may also be incorporated in this first embodiment of a decoder.

According to the teachings of the present invention in a second embodiment of a decoder, one or more parameters affecting the results of the allocation function are extracted from the encoded signal. In another implementation, explicit allocation values representing modified allocation values are extracted from the encoded signal.

Further embodiments of a decoder according to the teachings of the present invention are possible, including, but not limited to, an embodiment which incorporates a combination of the two embodiments described above. Furthermore, various combinations of the particular implementations described above are possible.

In a coding system using hybrid-adaptive allocation, side information may convey only modified allocation values and/or modified parameters. An allocation function known to both the encoder and the decoder provides basic allocation values to the decoder. Side information provides adjustments to the basic allocation values as necessary to obtain the same allocation values used in the encoder. In this way, the allocation function in an encoder may be changed without losing compatibility with existing decoders, and the number of bits required for side information to maintain compatibility between encoder and decoder is reduced.

The present invention may be used in split-band coders implementing filter banks by any of several techniques. It should be understood that although the use of subbands with bandwidths commensurate with human auditory system critical bandwidths allows greater exploitation of psychoacoustic effects, various aspects of the present invention are not so limited. Therefore, the term "subband" and the like as used herein should be understood as referring to one or more frequency bands within the useful bandwidth of an input signal.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 10b is a hypothetical graphical illustration of the composite impulse response of an embodiment similar to that shown in FIG. 8 but comprising only two filters, in which one of the filters has the impulse response shown in FIG. 10a.

MODES FOR CARRYING OUT THE INVENTION

Forward-Adaptive Allocation

Figure 1:
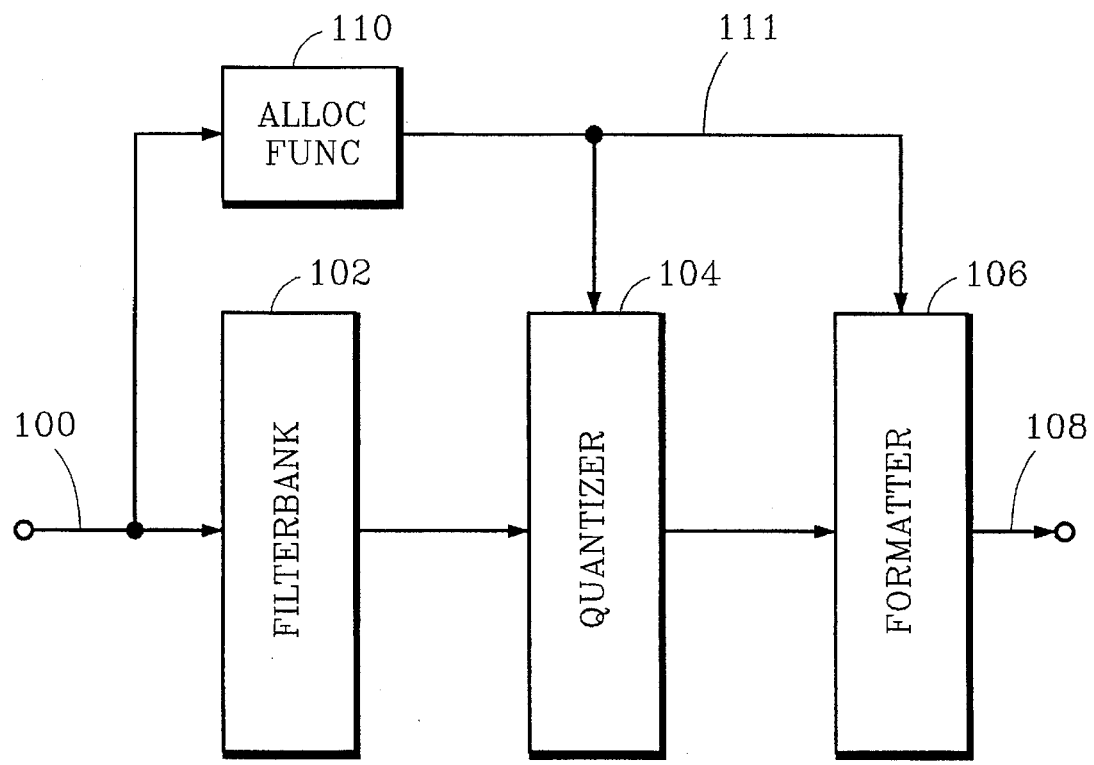
FIG. 1 is a block diagram illustrating one embodiment of an encoder in an encoder/decoder system incorporating forward-adaptive allocation.

FIG. 1 illustrates the basic structure of one embodiment of a split-band encoder used in an encoder/decoder system incorporating forward-adaptive allocation. Filterbank 102 generates subband information in response to an input signal received from path 100. Allocation function 110 establishes allocation values in response to the input signal and passes the allocation values along path 111 to quantizer 104 and formatter 106. Quantizer 104 quantizes the subband information received from filterbank 102 using a quantization function adapted in response to the allocation values, and formatter 106 assembles the quantized subband information and the allocation values into an encoded signal having a format suitable for transmission or storage. The encoded signal is passed along path 108 to a transmission channel or storage device as desired.

Figure 2:
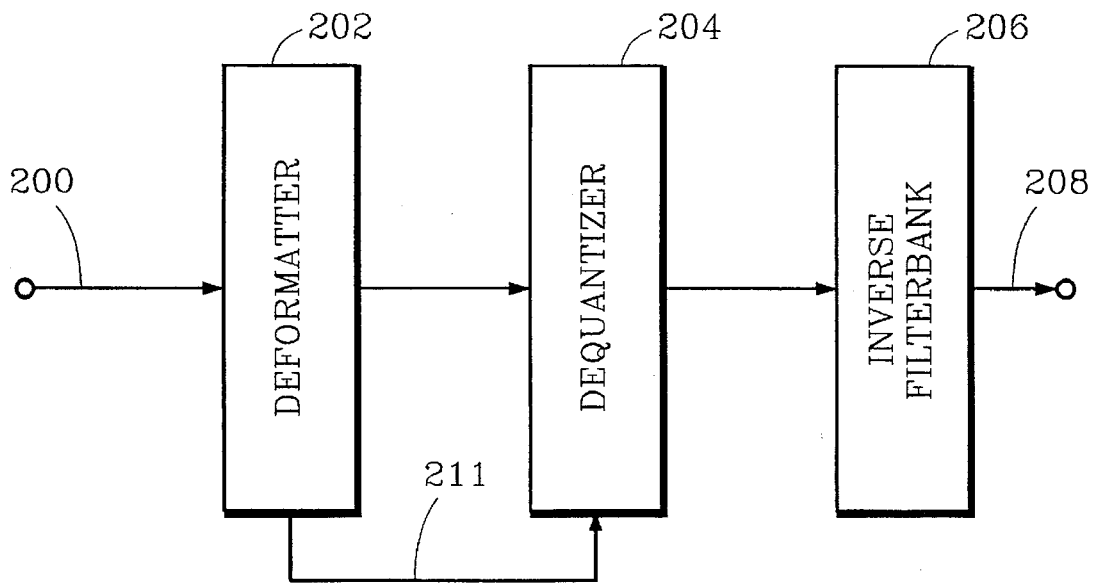
FIG. 2 is a block diagram illustrating one embodiment of a decoder in an encoder/decoder system incorporating forward-adaptive allocation.

FIG. 2 illustrates the basic structure of one embodiment of a split-band decoder used in an encoder/decoder system incorporating forward-adaptive allocation. Deformatter 202 extracts quantized information and allocation values from an encoded signal received from path 200. The allocation values are passed along path 211 and to dequantizer 204. Dequantizer 204 generates subband information by dequantizing the quantized information received from deformatter 202 using a dequantization function adapted in response to the allocation values. Inverse filterbank 206 generates along path 208 an output signal in response to the dequantized subband information received from dequantizer 204.

Figure 3:
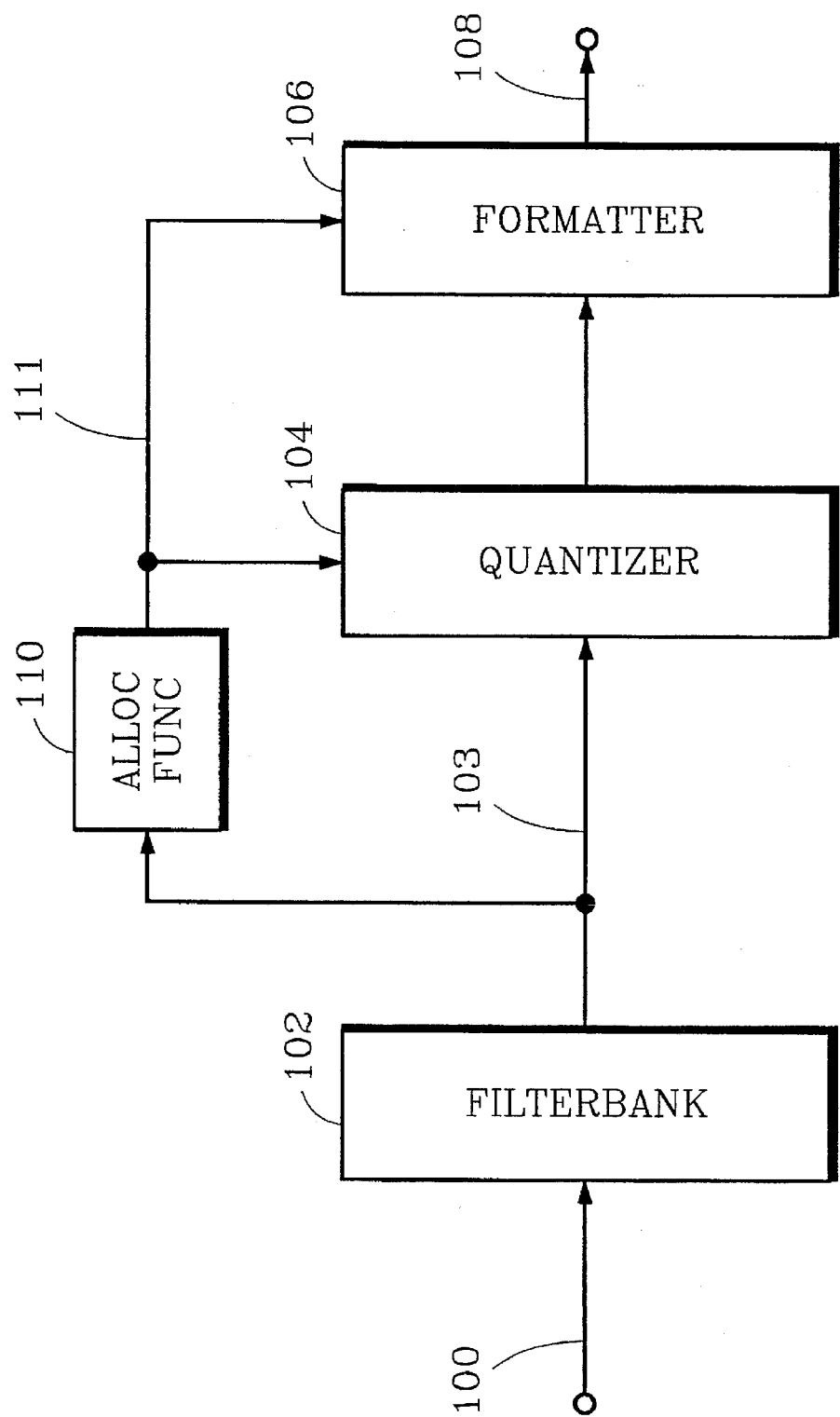
FIG. 3 is a block diagram illustrating another embodiment of an encoder in an encoder/decoder system incorporating forward-adaptive allocation.
Figure 13:
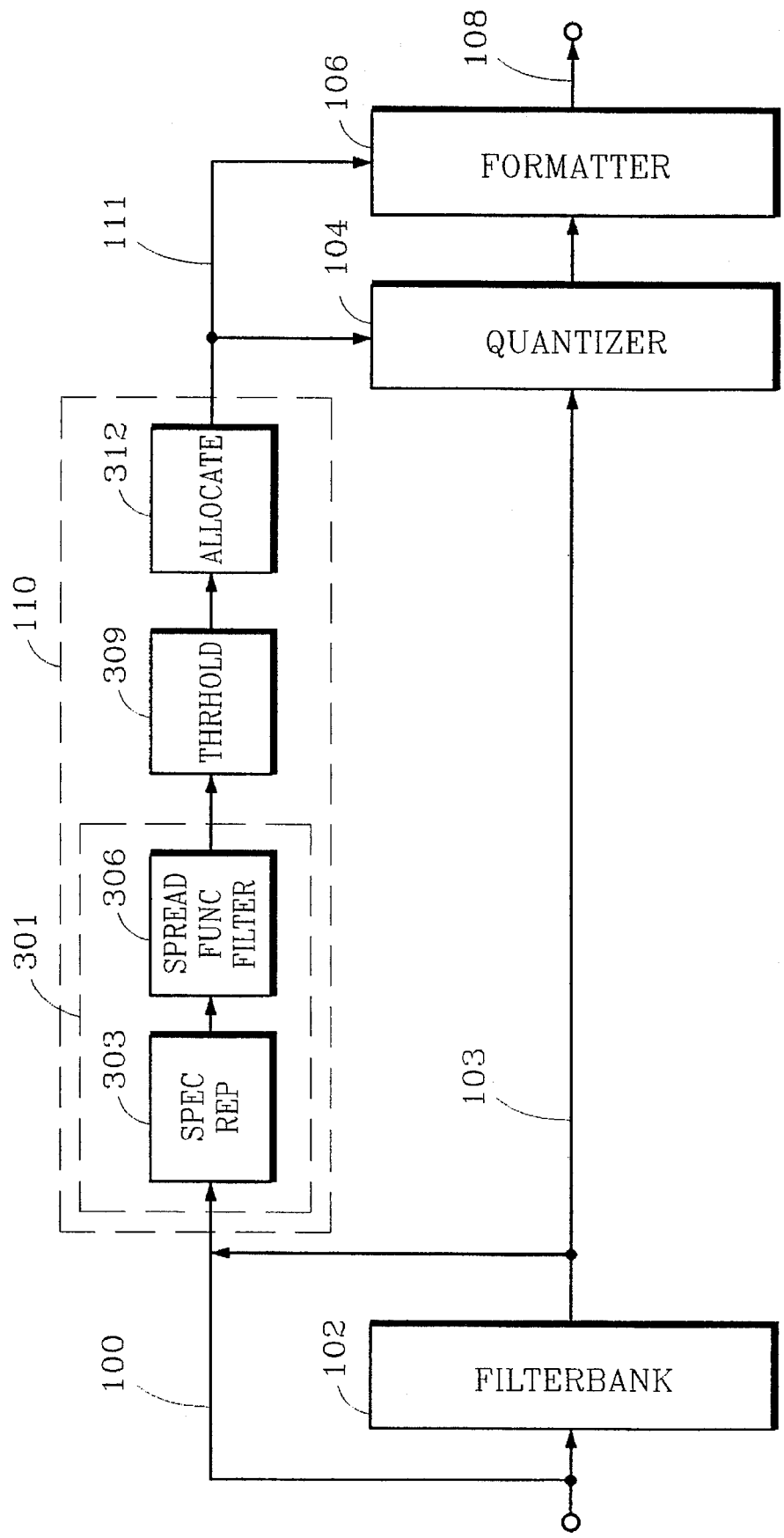
FIGS. 13–14 are block diagrams of encoders illustrating one embodiment of an allocation function.

Alternate embodiments of the encoder and decoder are possible. For example, as shown in FIG. 3, a forward-adaptive encoder may establish allocation values in response to the subband information generated by filterbank 102. In yet another embodiment such as that shown in FIG. 13, allocation values may be established in response to both the input signal and the subband information. FIG. 13 also illustrates additional detail for allocation function 110, discussed in more detail below, in which excitation 301 generates an excitation pattern, thrhold 309 generates a masking threshold in response to the excitation pattern, and allocate 312 establishes allocation values which are passed along path 111 to quantizer 104 and formatter 106. Excitation 301 comprises spec rep 303 which generates a spectral representation of the input signal in response to either the input signal received from path 100 and/or subband information received from path 103, and spread func filter 306 which generates the excitation pattern by applying one or more filters to the spectral representation.

As discussed above, because allocation values are explicitly passed in the encoded signal, the allocation function in a forward-adaptive encoder may be changed without sacrificing compatibility with existing forward-adaptive decoders. Only the format of the encoded signal must be preserved.

Backward-Adaptive Allocation

Figure 4:
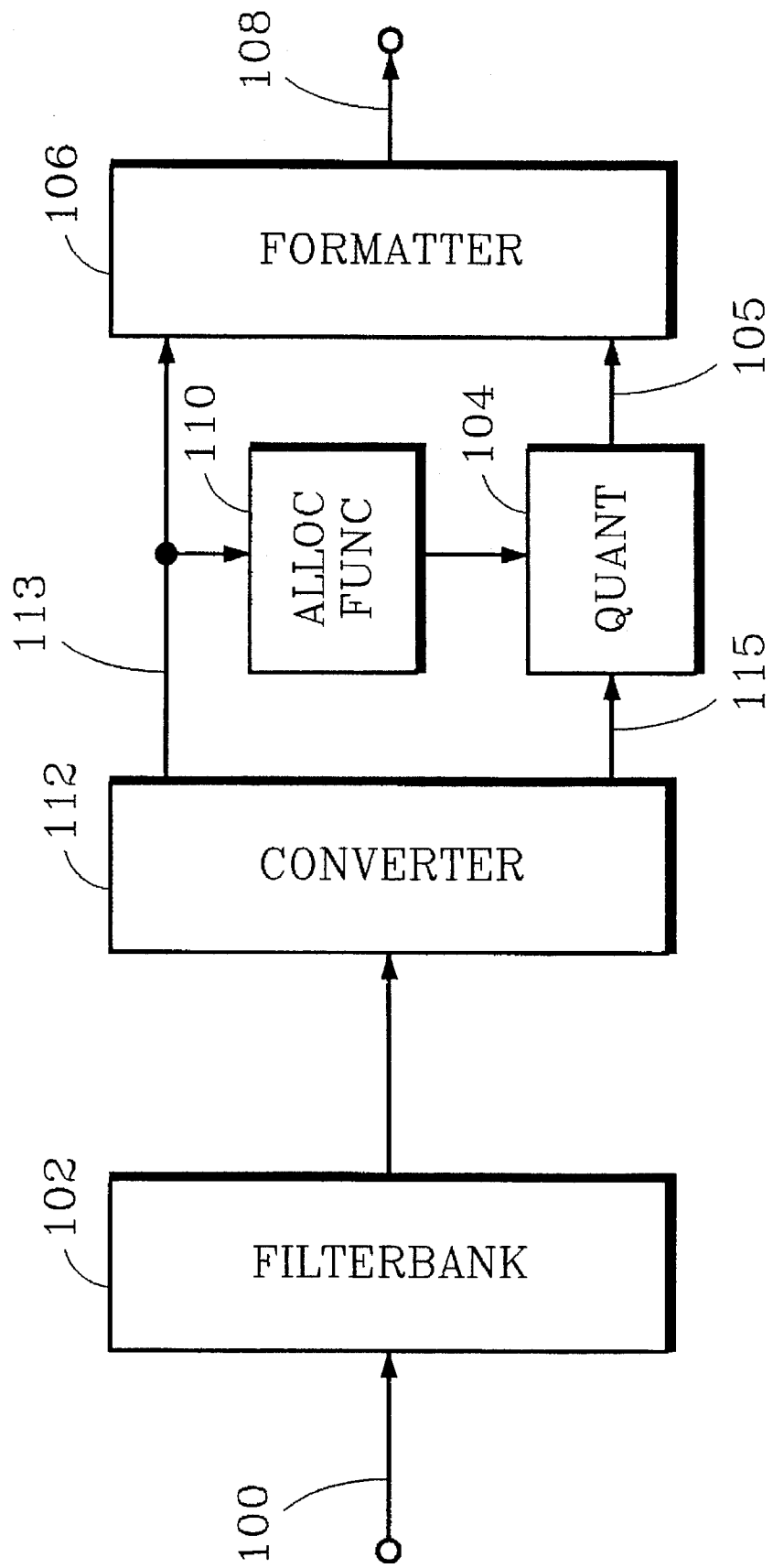
FIG. 4 is a block diagram illustrating one embodiment of an encoder in an encoder/decoder system incorporating backward-adaptive allocation.

FIG. 4 illustrates the basic structure of one embodiment of a split-band encoder used in an encoder/decoder system incorporating backward-adaptive allocation. Filterbank 102 generates subband information in response to an input signal received from path 100. Converter 112 generates a representation of the subband information comprising X words and Y words. The X words are passed along path 113 as input to allocation function 110 and to formatter 106. Allocation function 110 establishes allocation values in response to the X words and passes the allocation values to quantizer 104. Quantizer 104 generates quantized information by quantizing the Y words received from path 115 using a quantization function adapted in response to the allocation values, and formatter 106 assembles the quantized information and the X words into an encoded signal having a format suitable for transmission or storage. The encoded signal is passed along path 108 to a transmission channel or storage device as desired.

Figure 5:
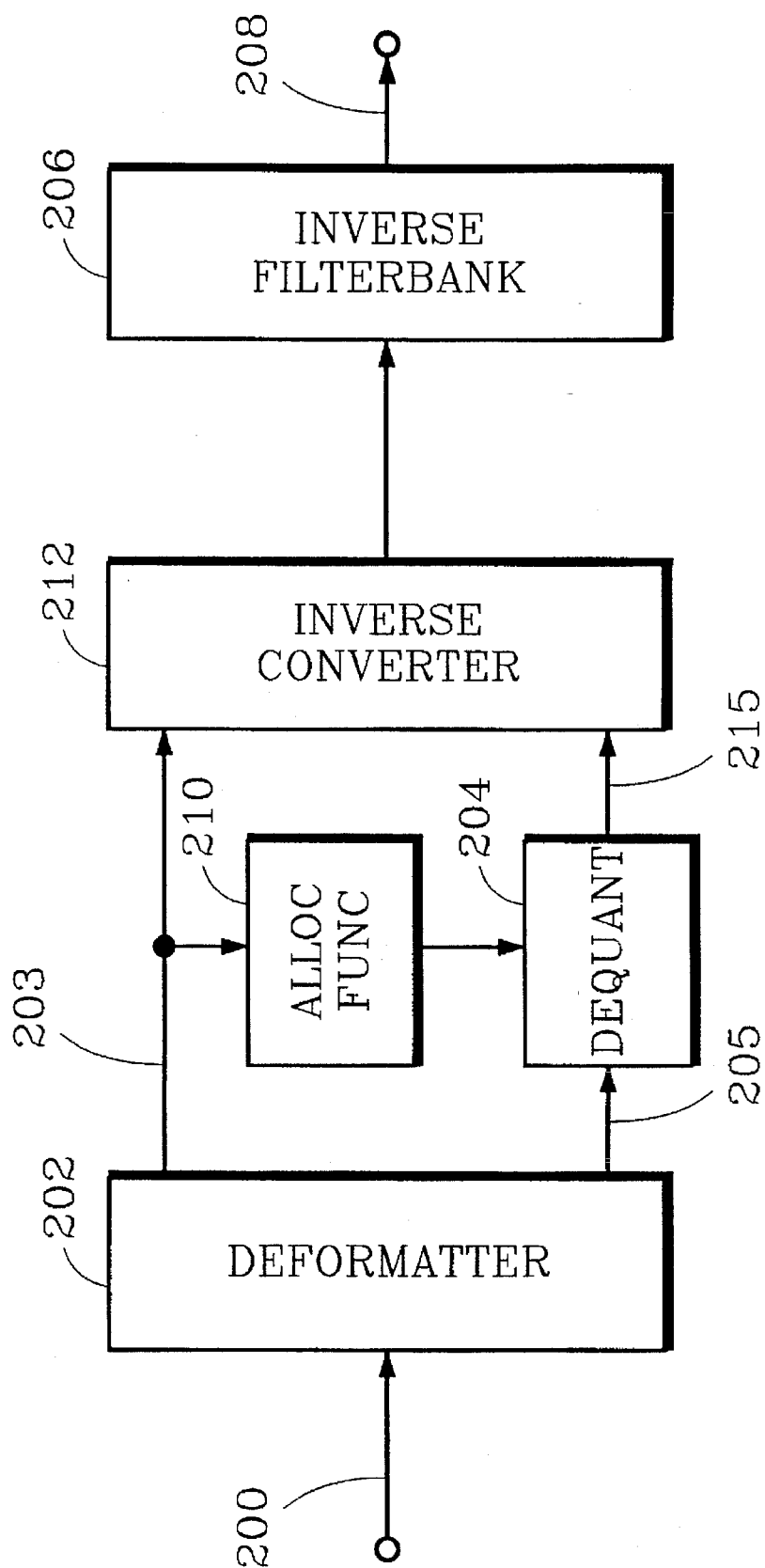
FIG. 5 is a block diagram illustrating one embodiment of a decoder in an encoder/decoder system incorporating backward-adaptive allocation.

FIG. 5 illustrates the basic structure of one embodiment of a split-band decoder used in an encoder/decoder system incorporating backward-adaptive allocation. Deformatter 202 extracts quantized information and X words from an encoded signal received from path 200. The X words are passed along path 203 to allocation function 210. Allocation function 210 establishes allocation values in response to the X words and passes the allocation values to dequantizer 204. Dequantizer 204 generates $\hat{Y}$ words by dequantizing the quantized information received from deformatter 202 using a dequantization function adapted in response to the allocation values. Inverse converter 212 generates subband information in response to the X words and the $\hat{Y}$ words, and inverse filterbank 206 generates along path 208 an output signal in response to the subband information received from inverse converter 212.

Figure 14:
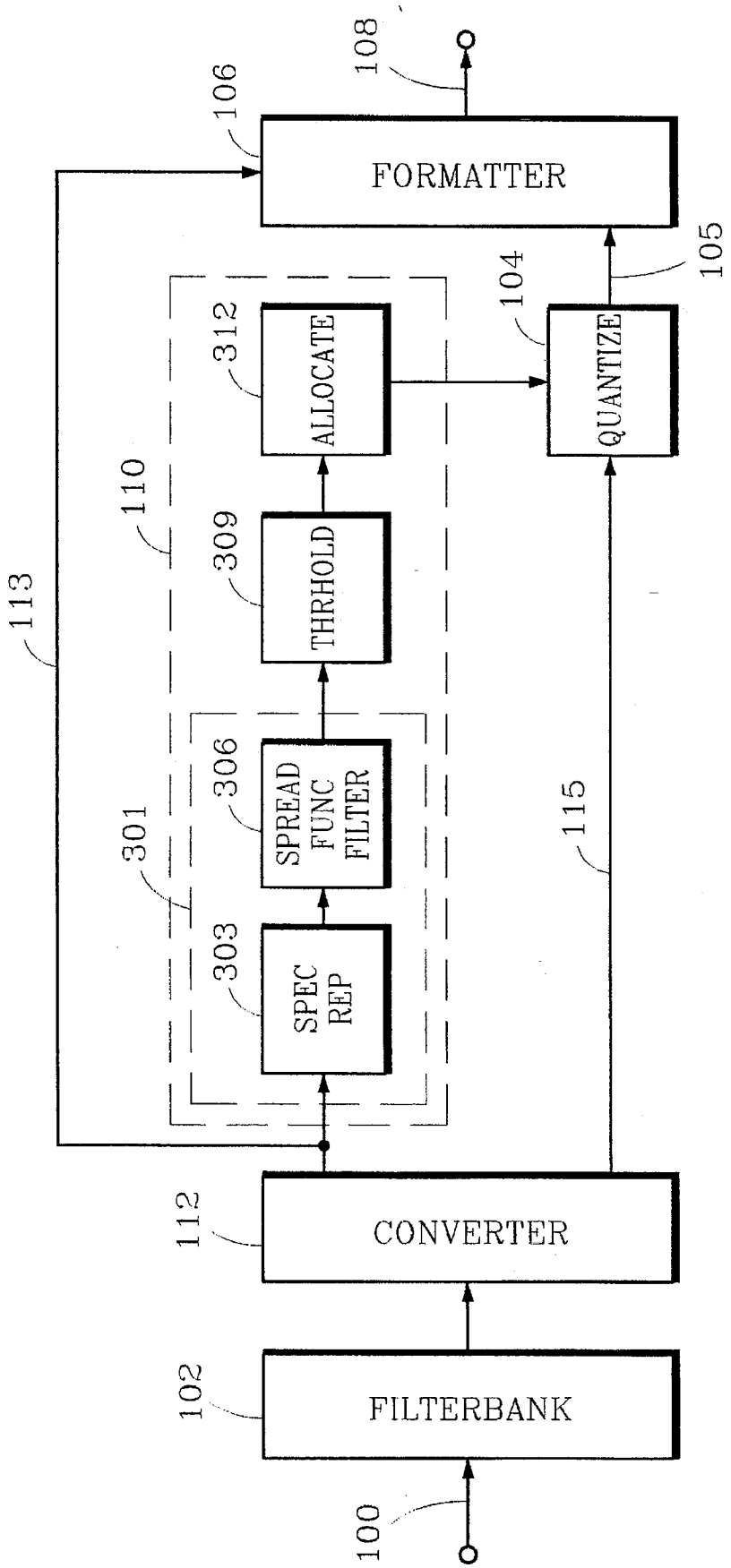
Figure 15:
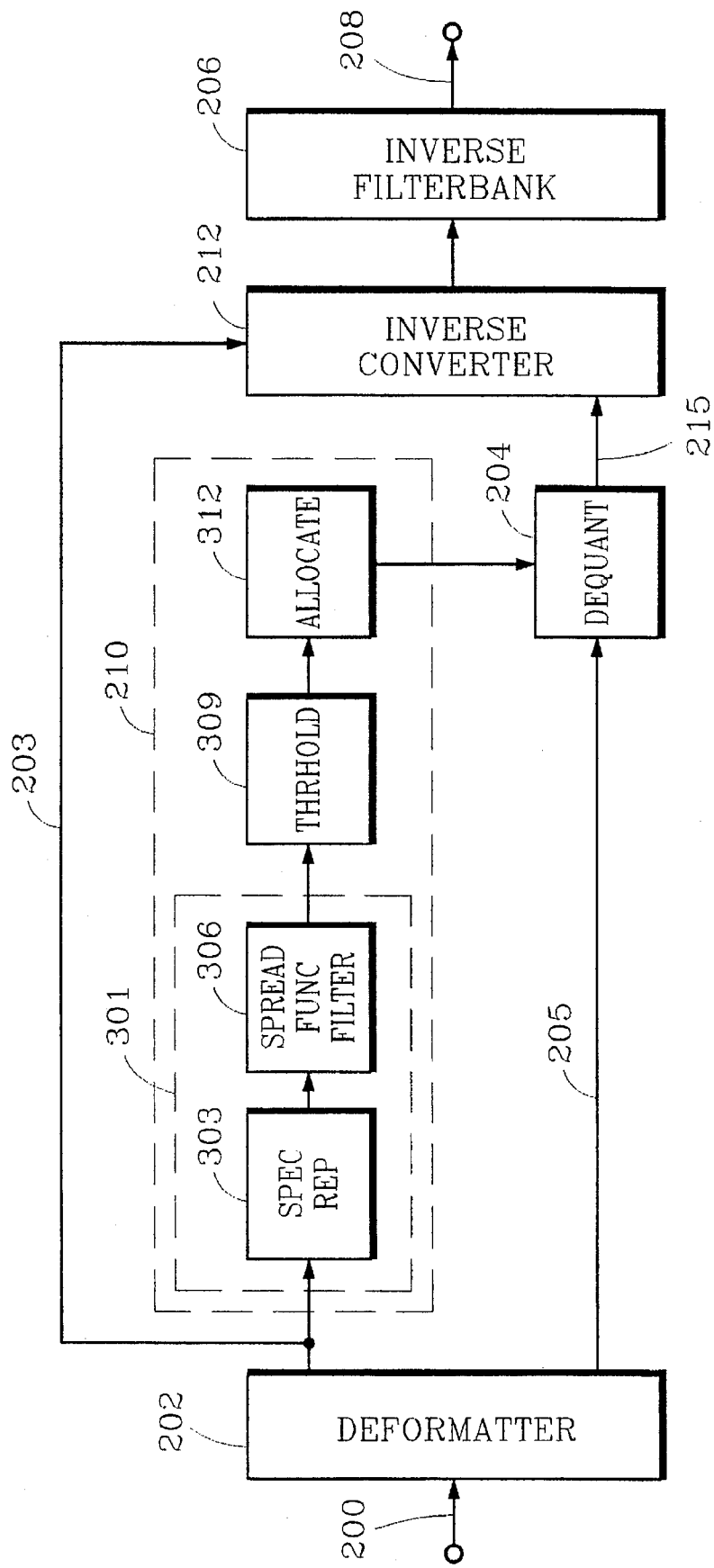
FIG. 15 is a block diagram of a decoder in an encoder/decoder system incorporating backward-adaptive allocation illustrating one embodiment of an allocation function.

FIGS. 14 and 15 illustrate the encoder and decoder of FIGS. 4 and 5, respectively, providing additional detail for an embodiment of allocation function 110 and allocation function 210, introduced above and discussed in more detail below.

Backward-adaptive coding systems may avoid the overhead required to convey side information in the encoded signal because the allocation values are represented implicitly by the X words assembled into the encoded signal. A backward-adaptive decoder can recover the allocation values from the X words by performing an allocation function which is equivalent to that previously performed in a backward-adaptive encoder. It should be understood that accurate decoding of the encoded signal does not require that the encoder and decoder allocation functions themselves be identical, but accurate decoding can be ensured only if the two functions obtain identical allocation values.

Hybrid-Adaptive Allocation

Figure 6:
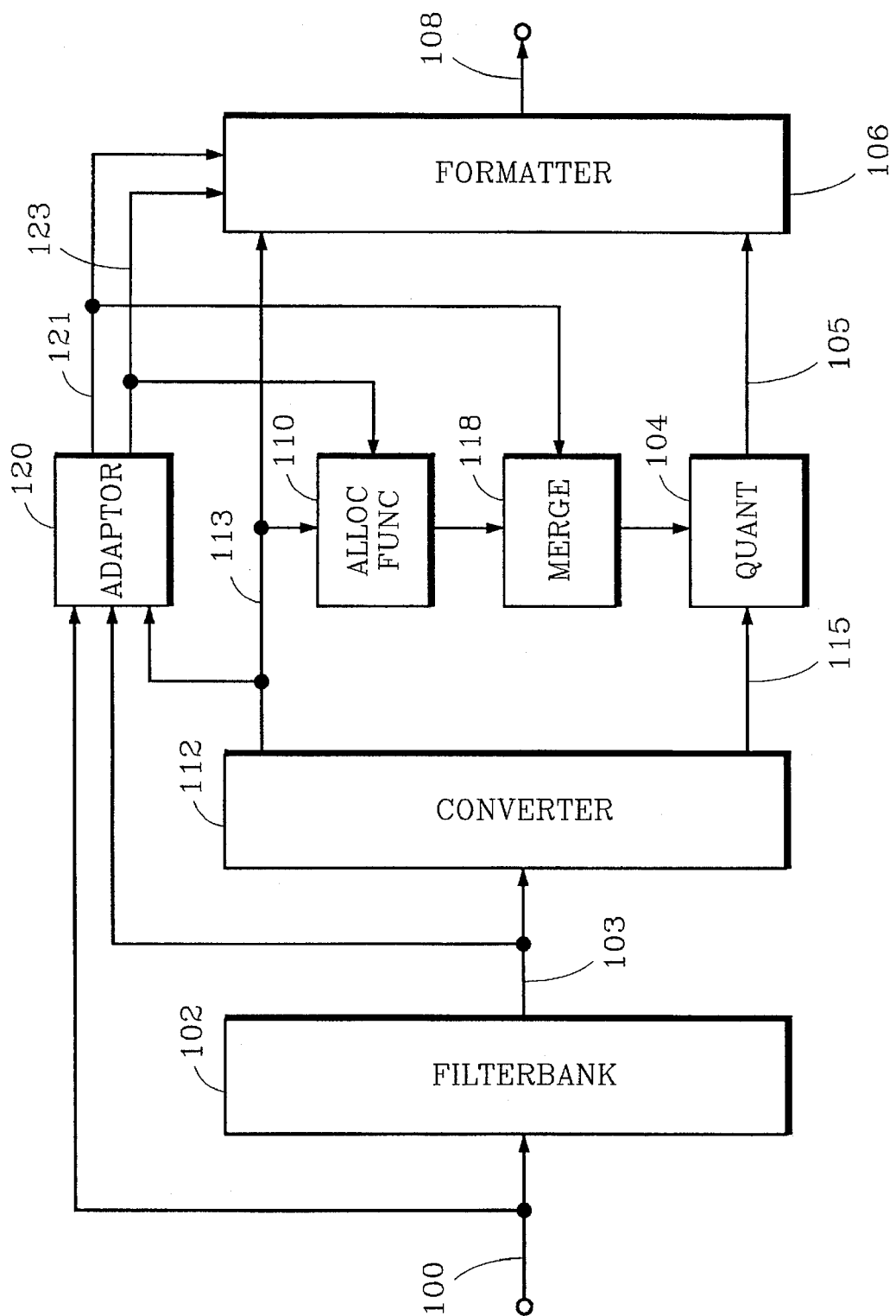
FIG. 6 is a block diagram illustrating one embodiment of an encoder in an encoder/decoder system incorporating hybrid-adaptive allocation.

FIG. 6 illustrates the basic structure of one embodiment of a split-band encoder used in an encoder/decoder system incorporating hybrid-adaptive allocation. The functions of the various elements within the embodiment shown in FIG. 4, discussed above, correspond to the functions of respective elements in the structure shown in FIG. 6. In addition, adaptor 120 modifies one or more of the allocation values established by allocation function 110 using either one or both of two basic techniques. The structure used to implement both techniques is illustrated in FIG. 6; however, either technique may be used alone and unnecessary functional elements may be removed from the illustrated structure.

In the first or "parameter" technique, adaptor 120 modifies one or more parameters which affect the results of allocation function 110. The modified parameters provided by adaptor 120 are passed along path 123 to allocation function 110 and to formatter 106. Formatter 106 assembles an indication of the modified parameters and the quantized information into an encoded signal having a format suitable for transmission or storage.

In the second or "value" technique, adaptor 120 modifies one or more allocation values. The modified values provided by adaptor 120 are passed along path 121 to formatter 106 and merge 118. Merge 118 merges the modified values with the allocation values received from allocation function 110 and passes the merged allocation values to quantizer 104. Formatter 106 assembles an indication of the modified values and the quantized information into an encoded signal having a format suitable for transmission or storage.

The embodiment illustrated in FIG. 6 shows adaptor 120 being responsive to the input signal received from path 100, the subband information received from path 103, and the X words received from path 113. In alternate embodiments of a hybrid-adaptive encoder, adaptor 120 may be responsive to any one of the three paths, responsive to any combination of the three paths, and/or responsive to other information.

Figure 7:
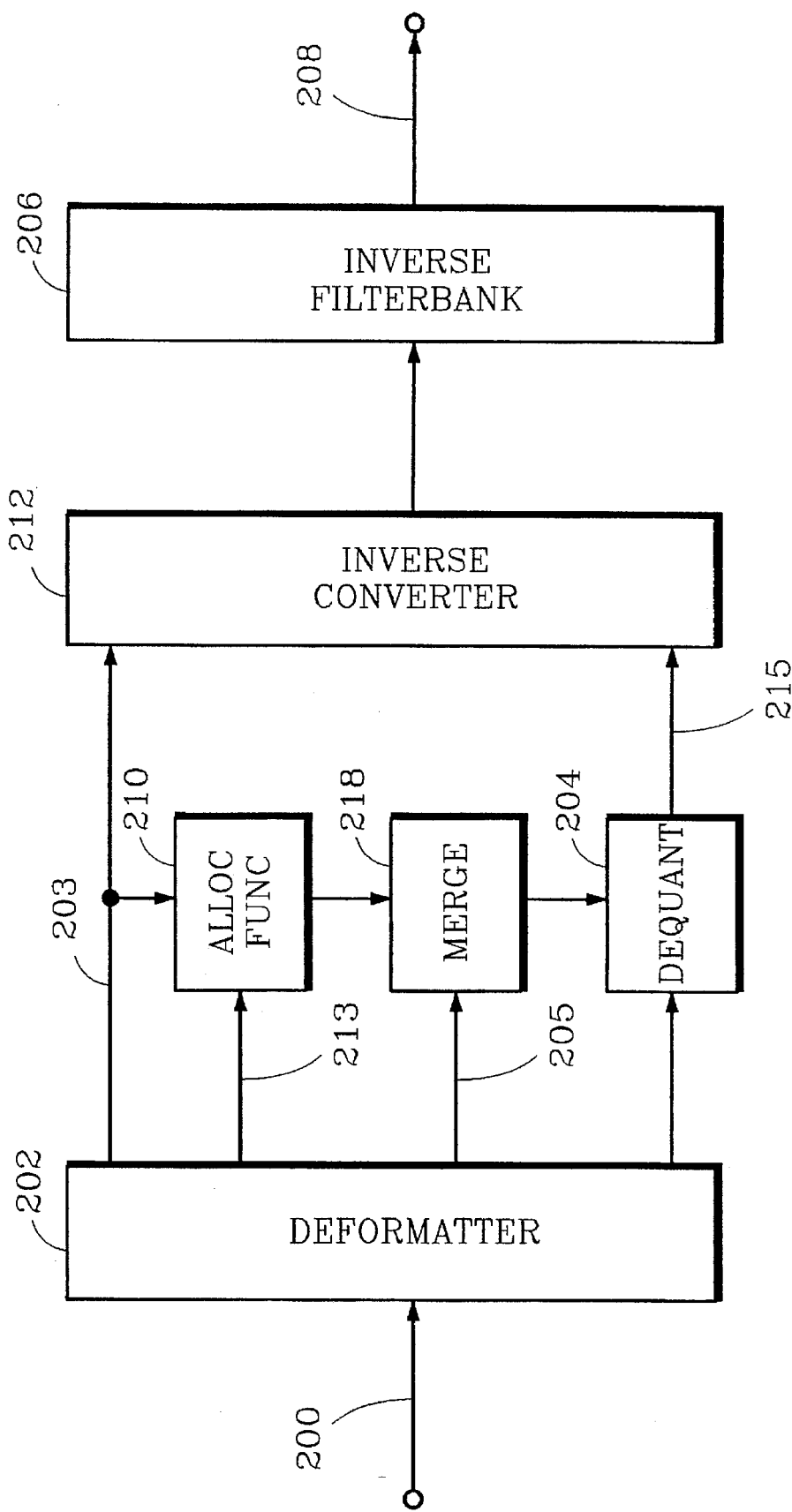
FIG. 7 is a block diagram illustrating one embodiment of a decoder in an encoder/decoder system incorporating hybrid-adaptive allocation.

FIG. 7 illustrates the basic structure of one embodiment of a split-band decoder used in an encoder/decoder system incorporating hybrid-adaptive allocation. The functions of the various elements within the embodiment shown in FIG. 5, discussed above, correspond to the functions of respective elements in the structure shown in FIG. 7. In addition, one or more of the allocation values are modified using either one or both of two basic techniques. The structure used to implement both techniques is illustrated in FIG. 7; however, either technique may be used alone and unnecessary functional elements may be removed from the illustrated structure.

In the first or "parameter" technique, deformatter 202 extracts from the encoded signal one or more modified parameters which affect the results of allocation function 210, and passes the modified parameters along path 213 to allocation function 210.

In the second or "value" technique, deformatter 202 extracts one or more modified values from the encoded signal and passes the modified values along path 205 to merge 218. Merge 218 merges the modified values with the allocation values received from allocation function 210, and passes the merged allocation values to dequantizer 204.

Implementation

Filterbank

The embodiments illustrated in FIGS. 1–7 may be realized by a wide variety of implementations. Filterbank 102 and inverse filterbank 206, for example, may be implemented by a variety of digital filtering techniques known in the art including, but not limited to, Quadrature Mirror Filters, polyphase filters and various Fourier transforms. A preferred embodiment uses the Time Domain Aliasing Cancellation (TDAC) transform disclosed in Princen, Johnson and Bradley, "Subband/Transform Coding Using Filter Bank Designs Based on Time Domain Aliasing Cancellation," *Proceedings Int. Conf. Acoust., Speech, and Signal Proc.*, May 1987, pp. 2161–2164. An example of a transform encoder/decoder system implementing a filter bank with the TDAC transform is described in U.S. Pat. No. 5,109,417, referred to above.

No particular implementation is critical to the practice of the present invention. Although the foregoing description of the present invention is more particularly directed toward digital split-band coding implementations, it should be understood that an encoder/decoder system incorporating aspects of the present invention may use analog filter banks as well. For example, filterbank 102 may comprise one or more analog filters and an analog-to-digital converter (ADC) which generates digital samples for each subband signal. Inverse filterbank 206 may comprise a digital-to-analog converter (DAC) which generates analog subband signals in response to digital samples and a component which combines the analog subband signals into a composite analog output signal.

Converter

Converter 112 and inverse converter 212 which generate and recover the X words and Y words may also be realized by a wide variety implementations. As discussed above, the X words are characterized by the fact that they are available to both encoder and decoder to inform the allocation function. The X words may, in general, correspond to scale factors and the Y words may correspond to values scaled in accordance with the scale factors. In embodiments utilizing various floating-point representations of numerical quantities, the X words may correspond to the floating-point exponents and the Y words may correspond to the floating-point mantissas.

In some implementations, groups or blocks of Y words are associated with a common X word exponent, forming a block-floating-point (BFP) representation. In a preferred embodiment, however, a higher-resolution spectral envelope is obtained from the X words by associating each Y word mantissa with one respective X word exponent.

Quantizer

The particular functions used by quantizer 104 and dequantizer 204 are not critical to the practice of the present invention, but the two functions should be complementary. In general, given the same allocation values, dequantization function $d(\chi)$ is the inverse of quantization function $q(\chi)$ such that the original quantity $\chi \approx d[q(\chi)]$. Strict equality is not expected because quantization usually results in the loss of some accuracy.

In response to the allocation values, quantizer 104 may adapt its quantization function in any of several ways. For example, quantizer 104 may set the number of quantizing levels according to the allocation values. An eight-level quantization function and a four-level quantization function could be used in response to values indicating an allocation of three bits and two bits, respectively. As another example, quantizer 104 could use a logarithmic quantization functions in response to allocation values greater than or equal to a specified level, say six bits, and use linear quantization functions in response to smaller values.

Quantizer 104 may also adapt its quantization function by switching between symmetric and asymmetric functions, or by adaptively using one or more quantizing levels to represent special ranges of amplitude. For example, U.S. patent application Ser. No. 07/981,286, referred to above, discloses an N-bit quantization function that uses one of its $2^N$ quantizing levels which would normally represent large amplitudes to instead represent very small amplitudes. By using such a quantization function, an encoder can allow a decoder to easily distinguish between small amplitudes, which are quantized to a value of zero, from very small amplitudes, which are quantized to the special quantizing level.

In response to the allocation values, dequantizer 204 adapts its dequantization function in a manner which is complementary to the manner in which quantizer 104 adapts its quantization function.

Merge

The methods used by merge 118 and merge 218 are not critical to the practice of the present invention. In concept, merge 118 and merge 219 combine into one set of values the corresponding values from a set of allocation values and a set of modified values. This may be done in a variety of ways. For example, an allocation value may be replaced by a corresponding modified value. In a split-band encoder, each allocation value represents the number bits to use in quantizing subband information in a respective subband. Each modified value supersedes the corresponding allocation value and is used by the quantizer instead.

As another example, the two sets of values may be combined by using the modified values to adjust corresponding allocation values. For example, the modified value can represent an incremental amount by which the corresponding allocation value should be changed. In a split-band encoder, the number of bits used to quantize subband information in a particular subband could be defined by the algebraic sum of the respective allocation value and the corresponding modified value, if the modified value is present in the encoded signal. Alternatively, the modified value may represent a factor by which the corresponding allocation value should be scaled.

Formatter

In many coding systems where the encoded signal is represented by a serial bit stream, the functions provided by formatter 108 and deformatter 202 substantially correspond to serial-bit-stream multiplexing and demultiplexing, respectively. Although the implementation of the formatting and deformatting functions may be important to a particular application, it is not critical to the practice of the present invention. Any process is suitable which can put the encoded signal into a form suitable for transmission or storage, and can recover the encoded signal from the formatted representation.

Allocation Function

Overview

Allocation 110 establishes allocation values according to psycho-perceptual principles. These allocation values are established such that the resulting quantizing noise, if possible, does not exceed a masking threshold. This process is discussed in more detail below. Although the discussion is directed more particularly to audio coding systems, the concepts presented may be used in a wider range of applications such as video coding.

The masking threshold is established by applying a mathematical model of human perception. A wide variety of models may be used with various aspects of the present invention. According to Schroeder, et al., cited above, the response of the human ear to acoustic energy can be modelled by (1) estimating the power spectral density (PSD) of the input signal, (2) obtaining the critical-band density of the input signal by mapping the PSD into critical bands, (3) generating a basilar-membrane excitation pattern by applying a basilar-membrane spreading function to the critical-band density information, (4) generating an interim masking threshold by adjusting the excitation pattern by an amount equal to a signal-to-noise ratio (SNR) offset sufficient to achieve psychoacoustic masking, (5) comparing the level of the interim masking threshold to a threshold of human perception, and (6) generating a masking threshold which is equal to the larger of the two.

Some of these steps may be combined or performed in a different order. For example, step 1 and step 2 can be reversed somewhat by first mapping the spectral components of an input signal into critical bands and then generating the critical-band density directly from the mapped components. As another example, step 2 through step 4 can be combined into a single step to generate an interim masking threshold by applying an appropriately weighted spreading function directly to the input signal PSD.

Figure 11:
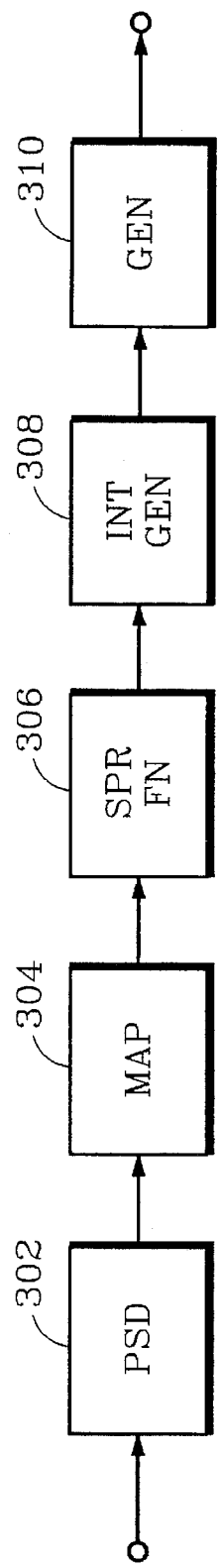
FIG. 11 is a block diagram illustrating an embodiment of a process in an allocation function based on psychoacoustic principles.

The following discussion is more particularly directed toward embodiments incorporating variations of the six steps listed above. These steps are used to explain various concepts and are not required to practice the present invention. For example, FIG. 11 illustrates an embodiment in which excitation 301 and thrhold 309 establish a masking threshold. According to this embodiment, psd est 302 estimates the PSD of the input signal, band map 304 obtains the critical-band density of the input signal by applying table 305 to map the PSD into critical bands, spread func filter 306 generates an excitation pattern by applying a spreading function to the critical-band density, interim thrhold gen 308 generates an interim threshold by adjusting the excitation pattern, and masking thrhold gen 310 generates a masking threshold by comparing the interim threshold with a threshold of human perception. Alternative embodiments may incorporate other auditory models which comprise other steps.

Power Spectral Density

Encoders in forward-adaptive systems may estimate the PSD of an input signal from information received from path 100 and/or path 103. For example, in systems incorporating filter banks implemented by a Fast Fourier Transform (FFT), the PSD may be obtained from the square of the magnitude of each of the resulting transform coefficients. Encoders in backward-adaptive systems, however, generally estimate the PSD from the X words received from path 113.

In one implementation in which the amplitude of each spectral component C is represented in a conventional binary floating-point form comprising an exponent X and a mantissa Y, the power of the spectral components in dB may be estimated directly from the values of the exponents. The value of each exponent is the power of two used to normalized the associated mantissa, or $C = Y \cdot 2^{-X}$. From this representation, the power of each spectral component may be estimated from an expression such as $$\hat{S}_b \approx 6(X_i + 0.5) dB. \qquad (1)$$

where $\hat{S}_i$=power of spectral component $C_i$, and $X_i$=value of the floating-point exponent for spectral component $C_i$.

In a preferred embodiment, each spectral component C is represented in floating-point form comprising a normalized mantissa Y and an exponent X. The PSD is estimated by grouping one or more spectral components into bands and obtaining the "log sum" of the exponents for the spectral components in each band. One way in which a log sum may be calculated is discussed below.

Conceptually, no particular method for estimating the PSD is critical to the practice of the present invention. As a practical matter, however, the accuracy of the method can significantly affect coding system performance.

Critical-Band Density

Split-band coding systems are generally more able to exploit psychoacoustic effects by dividing the input signal into subbands having bandwidths no more than one-half the critical bandwidths. This is usually necessary because coding system subbands have fixed center frequencies unlike the human auditory system critical bands which have variable center frequencies. It is sometimes incorrectly assumed that a dominant spectral component will mask other low-level spectral components throughout a split-band coder subband having a critical bandwidth. This assumption may not be true because the masking effects of a dominant spectral component diminish outside the frequency interval of one-half a critical bandwidth on each side of the spectral component. If this dominant spectral component occurs at the edge of a coding system subband, other spectral components in the subband can occur outside the actual critical bandwidth unless the subband bandwidth is no more that one-half a critical bandwidth.

In one embodiment, the input signal PSD is mapped into bands each having a bandwidth of about one critical bandwidth of the human auditory system. Each of the bands has a width of one Bark. In a preferred embodiment, the input signal PSD is mapped into "subcritical bands" having bandwidths of about one-half the critical bandwidths of the human auditory system, or widths of approximately one-half Bark. This preferred mapping is represented by the entries shown in Table I.

Alternate mapping functions and bandwidths may be used without departing from the concepts of the present invention. For example, from Schroeder, et al., a frequency f below about 5 kHz can be mapped into critical bands by the expression $$f = 650 \cdot \sinh \frac{x}{7} \qquad (2)$$

where $\chi$=critical band number.

To simplify the following discussion, the term "critical-band density" shall refer to an input signal PSD mapped into frequency bands of any convenient bandwidth including critical bandwidths and subcritical bandwidths. The critical-band density of the input signal can be obtained from the appropriate mapping function according to $$S(x) = \hat{S}[f(x)] \frac{df}{dx} \qquad (3)$$

where $\hat{S}(\chi)$=power spectral density of the input signal, and $S(\chi)$=critical-band density of the input signal.

Excitation Pattern

An excitation pattern approximately describes the distribution of energy along the basilar membrane which results from the acoustic power represented by an interval of the input signal. An excitation pattern can be calculated from the convolution $$E(\chi) = S(\chi) * B(\chi) \qquad (4)$$

where $E(\chi)$=is the excitation pattern resulting from the input signal, and $B(\chi)$=is a basilar-membrane spreading function.

Schroeder, et al. provide a convenient analytical expression for a spreading function across frequency bands having critical bandwidths. The expression, which provides the level of spreading in frequency band $\chi$ resulting from a spectral component in frequency band $\chi_0$, is $$10\log_{10}B(\Delta x) = 15.81 + 7.5(\Delta x + 0.474) - 17.5\sqrt{1 + (\Delta x + 0.474)^2} \quad dB \qquad (5)$$

where $\Delta\chi = \chi - \chi_0$.

The convolution of the input signal critical-band density $S(\chi)$ and the spreading function $B(\chi)$ is computationally intensive, having a computational complexity on the order of N·M, where N is the number of points in $S(\chi)$ and M is the number of points in $B(\chi)$. As a result, it is not practical to use the Schroeder model in many coding systems, particularly in backward-adaptive coding systems.

Figure 8:
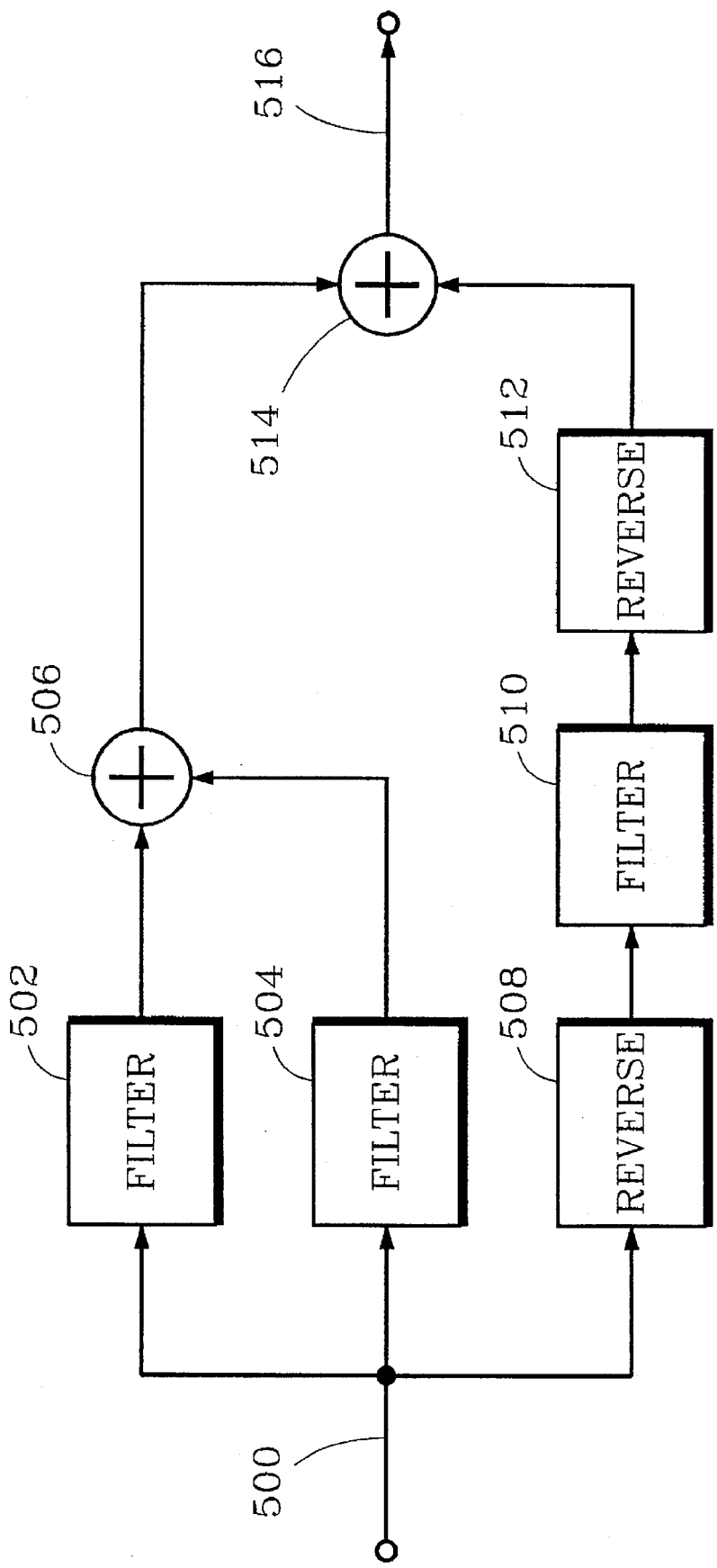
FIG. 8 is a block diagram illustrating an embodiment of a process by which an excitation pattern may be obtained efficiently.

FIG. 8 illustrates one embodiment of a process by which the excitation pattern may be obtained more efficiently, having a computational complexity on the order of N. According to this embodiment, information conveying input signal critical-band density is received from path 500, passed through three filters, and combined to form the excitation pattern.

The PSD may be scaled as a linear, logarithmic or other representation of power. If the PSD is a linear representation of input signal power and if the higher-frequency bands $\chi$ have a bandwidth expressed in Barks which is substantially constant, then these filters can be implemented as a single-pole IIR filter with a transfer function represented by the recursive expression $$F_i(\chi)=a_i(\chi)\cdot S(\chi)+b_i(\chi)\cdot F_i(\chi-1) \qquad (6)$$

where $a_i(\chi)$=gain factor for filter i, $b_i(\chi)$=rate of decay for filter i, $F_1(\chi)$=output of filter 502 at frequency band $\chi$, $F_2(\chi)$=output of filter 504 at frequency band $\chi$, and $F_3(\chi)$=output of filter 510 at frequency band $\chi$.

Figure 9A:
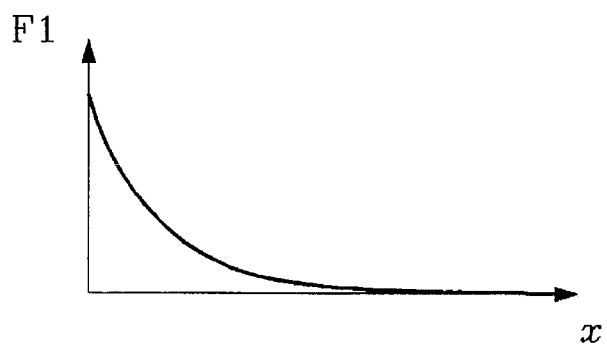
FIGS. 9a–9c are hypothetical graphical illustrations of impulse responses of single-pole filters which may be incorporated into the structure shown in FIG. 8.
Figure 9B:
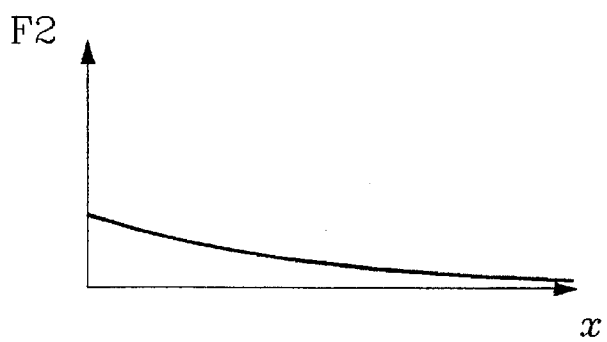
Figure 9C:
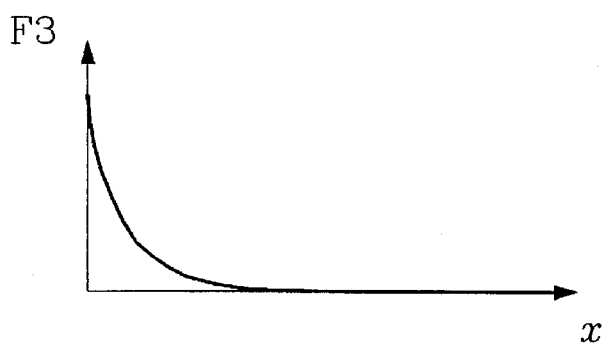

Hypothetical impulse responses of filter 502, filter 504 and filter 510 are illustrated in FIGS. 9a–9c, respectively.

If the PSD is a logarithmic representation of input signal power, filter calculations may be performed more efficiently in the log-power domain. One way in which these calculations may be performed is discussed below.

If the higher-frequency bands $\chi$ do not have bandwidths expressed in Barb which are substantially constant, then a more complex transfer function may be required for one or more of the filters. For example, if the frequency bands have a constant bandwidth, filter 502 preferably has one or more zeroes with a transfer function such as $$F_i(x) = a_i(x) \cdot S(x) + b_i(x) \cdot F_i(x-1) + [1 - b_i(x)] \sum_{j=1}^{M_i(x)} a_i(x-j) \cdot S(x-j) \qquad (7)$$

where $M_i(\chi)$=number of zeroes for filter $F_i$ at frequency band $\chi$.

Figure 10A:
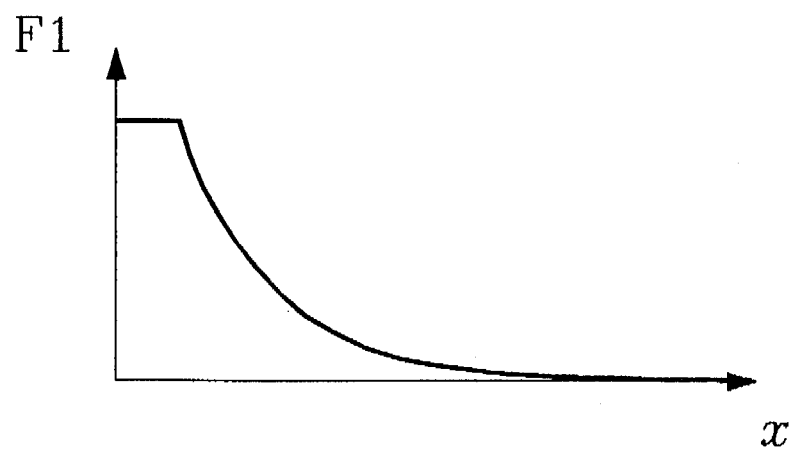
FIG. 10a is a hypothetical graphical illustration of an impulse response for a filter with one pole and one or more zeroes.

The third term in expression 7, in effect, delays the exponential decay in the impulse response. A hypothetical impulse response is shown in FIG. 10a. Each zero adds a "delay" of one frequency band. In genera, more zeroes are used for higher-frequency bands. For example, if each element in the PSD of a 20 kHz bandwidth input signal corresponds to a transform coefficient generated by a 512-point transform, then perhaps as many as ten zeroes will be required for the highest-frequency bands, but no zeroes are required for bands below about 500 Hz.

The accuracy of the spreading function can be improved at the expense of greater computational complexity by using filter coefficients which are functions of the frequency band number $\chi$. Preferably, the recursive term coefficient $b_i(\chi)$ provides more spreading for spectral components at higher frequencies. By mapping the input signal PSD into a set of frequency bands having appropriate bandwidths, however, a spreading function with reasonable accuracy can be obtained using a recursive term coefficient $b_i$ which is substantially invariant. Some variation in coefficient $b_i$ is more likely required in many coding systems for lower-frequency bands because the critical bandwidths are much narrower.

The filter characteristics may be established according to the needs of the coding application. It should be emphasized that these filters operate in a frequency-band domain which is a mapped frequency domain. The decay term for the filters represents a spreading of acoustic energy along the basilar membrane and provides an effect similar to that provided by convolution with a spreading function.

Referring to FIG. 8, reverse 508 performs a frequency-band reversal of the information received from path 500 prior to filtering by filter 510, and reverse 512 performs a frequency-band reversal of the filtered output. The two reverse elements and the interposed filter represent the spreading function along the basilar membrane at frequencies below a stimulus frequency.

Figure 9D:
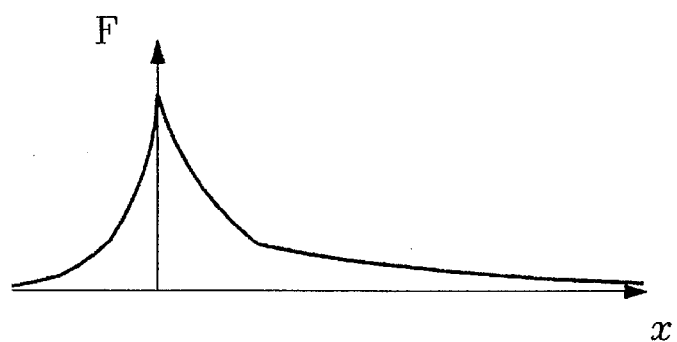
FIG. 9d is a hypothetical graphical illustration of the composite impulse response of the embodiment shown in FIG. 8 comprising filters having the impulse responses shown in FIGS. 9a–9c.

Component 506 and component 514 obtain the sum of their respective inputs. The sum resulting from component 5 14, which is the calculated excitation pattern, is passed along path 516. FIG. 9d represents the composite response characteristic of the structure illustrated in FIG. 8 which incorporates filters having the characteristics shown in FIGS. 9a–9c. If the critical-band density information received from path 500 is expressed in the log-power domain, then the sums calculated by component 506 and component 514 are log sums. One way in which log sums may be calculated is discussed below.

Figure 10B:
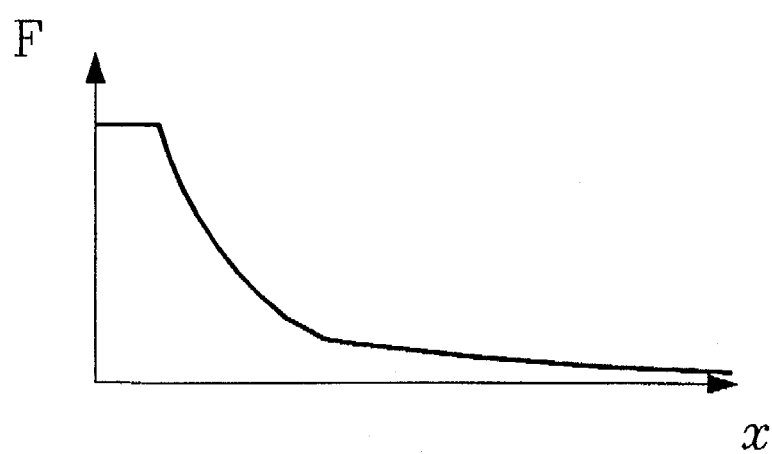

Many alternative embodiments are possible. For example, an embodiment having lower computational complexity may comprise only filter 502, filter 504 and component 506, and component 506 may combine the two filtered outputs by simply selecting the larger of the two. The results obtained by this simpler embodiment are acceptable in many high-quality coding applications. For example, FIG. 10b illustrates a hypothetical composite impulse response of this embodiment in which filter 502 has the impulse response shown in FIG. 10a and filter 504 has the impulse response shown in FIG. 9b. Table II shows filter coefficients $a_1(\chi)$ and $b_1(\chi)$ for filter 502 and coefficients $a_2(\chi)$ and $a_2(\chi)$ for filter 504 which are suitable for use in an embodiment using the PSD mapping shown in Table I. The coefficients are expressed in dB for use in the log-power domain, but may be easily converted to coefficients for use in the linear-power domain by dividing the entries in the table by ten and taking the antilogarithm of the quotient.

The filters may be implemented as IIR filters or FIR filters, but IIR filters are generally preferred because they are usually more efficient computationally. Computational complexity may be further reduced by performing the filter calculations in the log-power domain. The multiplications required to calculate expression 6 in the power domain can be implemented as additions in the log-power domain, or $$\log A=\log[a_i(\chi)\cdot S(\chi)]=\log a_i(\chi)+\log S(\chi) \qquad (8)$$

$$\log B=\log[b_i(\chi)\cdot F_i(\chi-1)]=\log b_i(\chi)+\log F_i(\chi-1). \qquad (9)$$

The addition of the two terms in expression 6 cannot be performed in a straight forward manner in the log-power domain. This addition, referred to as a "log sum," can be performed using the identity $$\log(A+B)=\max(\log A, \log B)+\log[1+\exp(-|\log A-\log B|)] \qquad (10)$$

where exp(y)=antilogarithm of the quantity y. By constructing a lookup table of the expression $$\log[1+\exp(-|\log A-\log B|)] \qquad (11)$$

for a suitable range of values |log A−log B|, the addition in expression 6 may be performed in the log-power domain by (1) finding the absolute value of the difference between log A and log B, (2) obtaining a value from the lookup table by using this difference as a key, and (3) adding the value obtained from the lookup table to the larger of log A and log B. This implementation is not essential to practice the present invention, but it is useful in many embodiments to further reduce computational complexity.

The lookup table can be reasonably compact because the smaller term is essentially negligible for differences in |log A−log B| greater than approximately 24 dB. In other words, reasonably accurate approximations of the log sum can be obtained for differences greater than approximately 24 db by assuming that the entry in the table is equal to zero.

Sensitivity Function

The basis of psychoacoustic masking effects is the fact that the human auditory system is desensitized by the presence of acoustic energy. A low-level signal, which is audible when isolated, may not be audible when accompanied by a much louder signal. The "sensitivity function" $w(\chi)$ of Schroeder, et al. approximates the degree to which the human auditory system is desensitized. This function, which provides the SNR required to ensure psychoacoustic masking within a critical band $\chi$, may be expressed as $$10 log_{10} w(\chi) = -(15.5+\chi) dB. \quad (12)$$

A simpler approach uses a sensitivity function of $w(\chi)=-20$ dB which simply sets the required SNR at a constant 20 dB.

In a preferred embodiment in which the maximum digital value represents 105 dB SPL, a conservative level is used to ensure masking by low-amplitude spectral components even when a playback system volume control is set to a very high level. This sensitivity function represented by the expression $$w(x) = \begin{bmatrix} -40 \text{ dB} & \text{for } 1 \leq x < 36 \\ 1.923x - 107.308 \text{ dB} & \text{for } 36 \leq x < 49 \\ -15 \text{ dB} & \text{for } 49 \leq x \end{bmatrix} \quad (13)$$

is suitable for use in an embodiment using the PSD mapping shown in Table I.

An interim masking threshold $Z(\chi)$ is defined relative to the excitation pattern $E(\chi)$, offset by the amount specified by the sensitivity function $w(\chi)$. The interim threshold is obtained from the expression $$Z(\chi) = w(\chi) + E(\chi) \quad (14)$$

in the log-power domain, or from the expression $$z(\chi) = w(\chi) \cdot E(\chi) \quad (15)$$

in the linear-power domain.

Masking Threshold

By definition, all acoustic energy below the threshold of hearing is inaudible; therefore, the SNR required to ensure that quantizing noise is masked does not need to suppress the quantizing noise any lower than the threshold of hearing. The threshold of hearing is well defined in the art. For example, see ISO standard 226 which provides information pertaining to equal-loudness contours of a "minimum audible field" in the ISO Standards Handbook, *Acoustics*, 1990, pp. 20–25. The function $\theta(\chi)$ is used herein to represent an analytical expression of this threshold.

The psychoacoustic masking threshold $M(\chi)$ may be obtained by comparing the threshold of hearing with the interim masking threshold and choosing point by point the larger of the two thresholds. This may be represented as $$M(\chi) = max[Z(\chi), \theta(\chi)]. \quad (16)$$

Allocation Values

In one simple embodiment, bits may be allocated at a rate of one bit for each 6 dB of required SNR, or $$A(x) = \begin{bmatrix} \frac{S(x) - M(x)}{6} & \text{for } S(x) \geq M(x) \\ 0 & \text{for } S(x) < M(x) \end{bmatrix} \quad (17)$$

where $A(\chi)$=allocation value for each spectral component in frequency band $\chi$.

In preferred embodiments, a more effective allocation is obtained by table lookup. The required SNR of the estimated spectral power $S(\chi)$ to the masking threshold $M(\chi)$ is used as the key into the lookup table, and each entry in the table represents the number of quantizing levels required to achieve the required SNR.

The lookup table entries may be based upon quantizing relationships well known in the art and used in various prior art coding systems. Conceptually, no particular lookup table is critical to the practice of the present invention but as a practical matter, the entries in the lookup table can significantly affect coding system performance.

One way in which entries in the table may be derived for a particular coding system is to measure the SNR resulting from that coding system incorporating quantization functions which are forced to quantize spectral information into a given number of quantizing levels. Table III, for example, indicates that a SNR of 8.21 dB and 11.62 dB are obtained by a particular embodiment of a coding system which uses a quantization function having three quantizing levels and five quantizing levels, respectively. According to the entries in this table, spectral components requiring a SNR of more than 8.21 dB but less than or equal to 11.62 dB should be allocated enough bits to be quantized into five levels.

In this implementation, the lower bound of the table is zero quantizing levels at 0 dB, and the upper bound of the table is set at some maximum number of bits referred to herein as the "allocation ceiling." According to the example shown in Table III, the allocation ceiling corresponds to 65,536 quantizing levels, which can be represented by 16 bits.

In many coding systems, the allocation function establishes allocation values which allocate a specified number of bits. This number is referred to herein as the "bit budget." If the total number of bits allocated by the allocation function exceeds the bit budget, the allocation function must revise the allocation values accordingly. If the total number of bits allocated by the allocation function is less than the bit budget, it is preferable to revise the allocation values to optimize the use of the residual bits.

Figure 12:
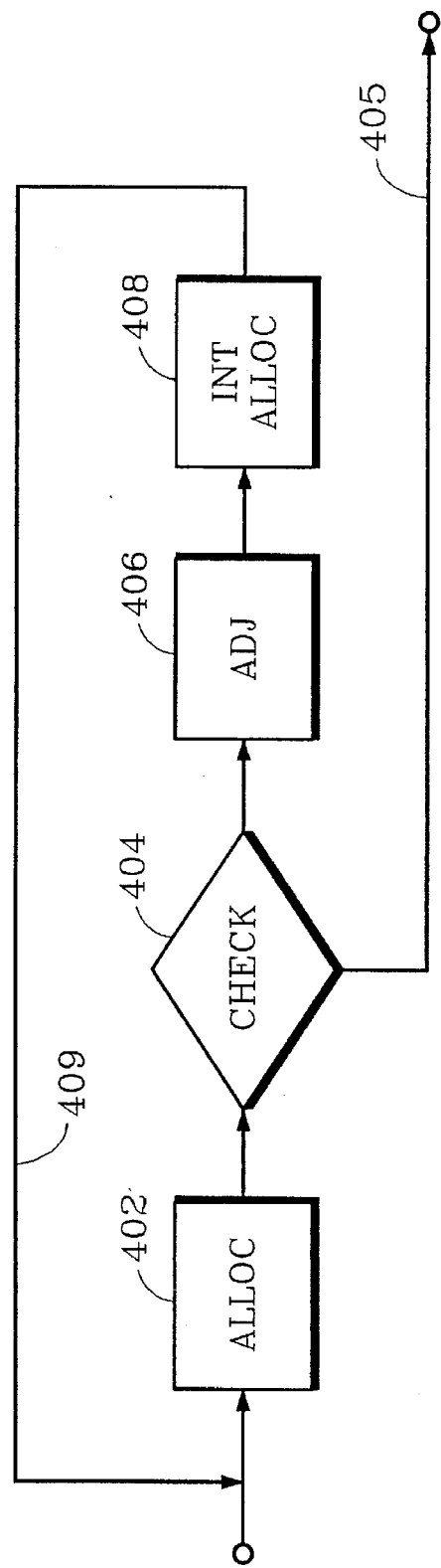
FIG. 12 is a flow diagram illustrating an embodiment of an allocation function which allocates bits to interim spectral components.

In some embodiments, allocation values are refined by adjusting the level of the masking threshold $M(\chi)$ and recalculating the allocation values. For example, FIG. 12 illustrates an embodiment of allocation 312 in which alloc 402 establishes allocation values, and check alloc 404 determines if the total number of allocated bits is sufficiently close to the bit budget. If not, adjust thrhold 406 adjusts the level of the masking threshold $M(\chi)$ and continues along path 409 to allow the allocation process to reiterate. Component 408, discussed below, is not needed in this particular embodiment and can be omitted. If check alloc 404 determines that the total allocation is sufficiently close to the bit budget, the process continues along path 405. Preferably, the threshold of hearing is taken into account as the masking threshold is raised and lowered. In one embodiment, this is accomplished by raising and lowering the interim masking threshold $Z(\chi)$ across some or all of the spectrum and reestablishing the masking threshold according to expression 16 until the total number of allocated bits is sufficiently close to the bit budget. For ease of discussion, the notation $M_0(\chi)$ is used to refer to an initial or "ideal" masking threshold obtained from an auditory model before any adjustments are made to refine allocation values.

In one embodiment, the masking threshold may be lowered by as much as 72 dB and raised by as much as 24 dB with respect to the $M_0(\chi)$ masking threshold. These adjustments correspond to allocating approximately 12 additional bits and 4 fewer bits per spectral component, respectively. Initially, the masking threshold is set to a level 24 dB below $M_0(\chi)$, which is mid-way between the two extremes of 72 dB and −24 dB. The allocation values are calculated and compared to the bit budget. A binary search technique makes coarse adjustments to the masking threshold to converge the total bit allocation to a value which is equal to or less than the bit budget. The binary search reiterates the coarse adjustments until either the total bit allocation equals the bit budget or until the incremental adjustment to the masking threshold is less than 1.5 dB. Following these coarse adjustments, the binary search makes fine adjustments to the masking threshold to establish a level as much as 6 dB lower which converges the total bit allocation more closely to the bit budget. This binary search reiterates the fine adjustments until either the total bit allocation equals the bit budget or until the incremental adjustment to the masking threshold is less than 0.375 dB. The difference between the adjusted threshold and $M_0(\chi)$ may be passed in the encoded signal, allowing the decoder to establish the allocation values directly without repeating the convergence process.

This same coarse/fine adjustment process may be used in multi-channel coding systems in which bits are allocated to spectral components in all channels from a common pool of bits. In an alternative embodiment, coarse adjustments are made only to a masking threshold common to all channels. After the total allocation for all channels has converged sufficiently, fine adjustments are made to masking thresholds associated with individual channels until the total allocated bits is equal to or sufficiently close to the bit budget. The fine adjustments may be made by: (1) completing one adjustment to a respective masking threshold for each channel in turn, adjusting across all the channels until converging, or (2) adjusting a respective masking threshold for each channel in turn until converging, starting with a highest-priority channel and proceeding to a lowest-priority channel.

A process similar to that just described for multi-channel coding systems may be used in other coding systems with one or more channels. Bits may be allocated from a common pool of bits to spectral components over an extended period of time. In a transform coding system for example, coarse adjustments are made to allocations across multiple blocks of transform coefficients until the total allocation for the multiple blocks converges sufficiently close to the bit budget. The fine adjustments may be made by adjusting a respective masking threshold for each block in turn, adjusting across all of the blocks until converging. This process is applicable to other split-band coding systems such as sub-band coding systems. It may also be adapted for use in multi-channel coding systems.

As these examples show, many variations in the convergence process are possible. If an allocation ceiling is used in a particular implementation, then the convergence process should not allow an allocation value to exceed this ceiling.

If the masking threshold is raised to bring the total bit allocation within a bit budget, it is possible that one or more "intermediate" spectral components may exceed the initial threshold $M_0(\chi)$ but not exceed the adjusted threshold $M(\chi)$. According to expression 17, these intermediate spectral components are not allocated any bits and are, therefore, excluded from the encoded signal. This exclusion may be audible, especially if the exclusion is intermittent. For example, the harmonics of a sustained note may be intermittently excluded during intervals having considerable acoustic energy elsewhere in the spectrum. FIG. 12 illustrates one structure of int alloc 408 in which intermed alloc 409 allocates additional bits to one or more of these intermediate spectral components, if present. In this embodiment, restrict 407 limits allocation to intermediate spectral components in any of several ways as described below.

If bits are allocated to these intermediate spectral components, the bit budget can be balanced by decreasing the allocation to larger spectral components; however, the resulting degradation in the coding quality of the larger spectral components is likely to be audible. Preferably, bits should be allocated so as to obtain a balance between the audible effects of excluding intermediate spectral components on the one hand and degrading the coding quality of larger spectral components on the other hand.

In one embodiment, an attempt to achieve such balance is made by allocating only a minimum number of bits to all intermediate spectral components. In a particular implementation, this is accomplished by quantizing all intermediate spectral components using the quantization function having the minimum number of quantizing levels.

In another embodiment, balancing is attempted by allocating a minimum number of bits to only those intermediate spectral components within a limited frequency range. This range extends from the highest-frequency spectral component which exceeds the adjusted masking threshold up to the upper limit of the encoded signal bandwidth.

In yet another embodiment, balancing may be attempted by allocating bits to only those intermediate spectral components which are no more than some level, say 9 dB, below the adjusted masking threshold. In a variation of this embodiment, the level below the adjusted threshold is modified to ensure that the number of bits allocated to intermediate spectral components does not exceed a percentage of the bit budget. As another example, the number of bits allocated to these intermediate spectral components may be balanced by controlling the bandwidth of the frequency range within which these allocations may take place.

The audible consequences of allocating bits to these intermediate spectral components may be reduced by controlling the rate at which these allocations may be changed. For example, intermediate spectral components may be excluded from allocation by reducing the allocation bandwidth over an interval of several hundreds of milliseconds. In effect, modifications to criteria used to exclude intermediate spectral components are subject to a low-pass filter.

Allocation of Residual Bits

If the number of bits allocated thus far is less than the bit budget, the residual bits may be allocated in any number of ways. In one embodiment, a two-step process is used: (1) starting with the lowest-frequency band and proceeding upward in frequency, the allocation for a frequency band is increased if either (a) the respective allocation value is more than zero and less than the allocation ceiling, or (b) the allocation value is zero and the allocation value for either adjacent frequency band was more than zero at the start of step 1; and (2) while any bits remain, starting with the lowest-frequency band and proceeding upward in frequency, the allocation value for each frequency band is increased if the respective allocation value is less than the allocation ceiling. Step 2 reiterates until no residual bits remain.

The allocation of residual bits can be avoided or minimized by allowing the convergence process to converge sufficiently close to the bit budget so that there are very few if any residual bits.

Adaptor

In split-band coding systems using allocation functions which are based upon various psycho-perceptual effects, any parameter affecting the underlying psycho-perceptual model may be modified to adapt the allocation function. In audio coding applications, for example, such parameters include (1) the filter coefficients of equation 6 or equation 7 which model the level of psychoacoustic masking above and/or below a masking tone, (2) the characteristics of the sensitivity function which provides the SNR offset from the excitation pattern, (3) the level of inter-channel masking in a multi-channel system, (4) the bandwidth of the input signal, (5) the minimum number of bits to allocate to subband information as a function of frequency, (6) the allocation ceiling, possibly as a function of frequency, and (7) the number of additional bits to allocate to a spectral component for each incremental increase in amplitude as a function of spectral amplitude. Empirical evidence indicates that a higher SNR is required to achieve masking at higher amplitudes; therefore, an allocation of one additional bit per 6 dB increase in amplitude may be required at high amplitudes but an allocation of only one bit per 12 db increase may be adequate at lower amplitudes.

Adaptor 120 may utilize either or both of the "parameter" technique and the "value" technique to adapt the results of the allocation function. The "parameter" technique entails modifying one or more parameters such as those discussed above. The "value" technique entails generating one or more modified values which are merged with the allocation values obtained from the allocation function.

The particular process used to implement either technique is not critical to the practice of the present invention. One approach comprises performing an alternative allocation function, comparing the results of the alternate function with the "basic values" obtained from basic allocation function 110, and forming modified values for each alternate value where the difference between it and the respective basic value is significant. The complexity of the basic allocation function may be restricted so as to simplify the decoder, but the alternate allocation function may be as complex as desired. In audio coding applications, for example, the alternate function may use a more sophisticated psychoacoustic model including consideration for signal characteristics such as the flatness of the input signal spectrum, the average or peak amplitude of the input signal, and whether a masking component is tone-like or noise-like.

Another exemplary adapting process avoids performing a complete allocation function, merely generating adjustments to the basic allocation values in response to the detection of various signal characteristics. For example, the basic allocation values may be increased in response to detecting tone-like masking components, or the basic allocation values may be decreased in response to detecting that the input signal spectrum is essentially flat.

As discussed above, adaptor 120 may be responsive to the input signal, the subband information obtained from filter-bank 102, the X words obtained from converter 112, or any other information of significance to the particular application. In a coding system for a long-distance telephone network, for example, adaptor 120 may be responsive to date, time-of-day and day-of-week information so as to provide an allocation function which reduces bit allocations, thereby trading off lower information requirements with higher fidelity coding, in anticipation of forecasted increases in traffic through the network.

In a digital video display system, for example, adaptor 120 may provide an allocation function which is responsive to operator input, thereby allowing the operator to tradeoff shorter display response times against higher picture resolutions.

As these examples show, adaptor 120 may be responsive to any information which is desired in a particular application. The choice of this information is not critical to the practice of the present invention.

It should be appreciated that the present invention may be practiced within numerous embodiments implemented by a wide variety of techniques.

Although the foregoing discussion is more particularly directed toward audio coding applications, the present invention may be practiced in a wider range of psycho-perceptual coding applications such as video coding.

TABLE I

| | Critical-Band Mapping | | | | |
|---|---|---|---|---|---|
| Band No. x | Low Freq. (kHz) | High Freq. (kHz) | Band No. x | Low Freq. (kHz) | High Freq. (kHz) |
| 1 | 0.0250 | 0.0750 | 26 | 1.9250 | 2.0750 |
| 2 | 0.0750 | 0.1250 | 27 | 2.0750 | 2.2375 |
| 3 | 0.1250 | 0.1750 | 28 | 2.2375 | 2.4125 |
| 4 | 0.1750 | 0.2250 | 29 | 2.4125 | 2.6000 |
| 5 | 0.2250 | 0.2750 | 30 | 2.6000 | 2.8000 |
| 6 | 0.2750 | 0.3250 | 31 | 2.8000 | 3.0250 |
| 7 | 0.3250 | 0.3750 | 32 | 3.0250 | 3.2750 |
| 8 | 0.3750 | 0.4250 | 33 | 3.2750 | 3.5500 |
| 9 | 0.4250 | 0.4800 | 34 | 3.5500 | 3.8500 |
| 10 | 0.4800 | 0.5400 | 35 | 3.8500 | 4.2000 |
| 11 | 0.5400 | 0.6025 | 36 | 4.2000 | 4.6000 |
| 12 | 0.6025 | 0.6675 | 37 | 4.6000 | 5.0500 |
| 13 | 0.6675 | 0.7350 | 38 | 5.0500 | 5.5500 |
| 14 | 0.7350 | 0.8050 | 39 | 5.5500 | 6.1000 |
| 15 | 0.8050 | 0.8800 | 40 | 6.1000 | 6.7000 |
| 16 | 0.8800 | 0.9600 | 41 | 6.7000 | 7.3750 |
| 17 | 0.9600 | 1.0425 | 42 | 7.3750 | 8.1250 |
| 18 | 1.0425 | 1.1275 | 43 | 8.1250 | 9.0000 |
| 19 | 1.1275 | 1.2200 | 44 | 9.0000 | 10.0000 |
| 20 | 1.2200 | 1.3200 | 45 | 10.0000 | 11.2500 |
| 21 | 1.3200 | 1.4275 | 46 | 11.2500 | 12.7500 |
| 22 | 1.4275 | 1.5425 | 47 | 12.7500 | 14.5625 |
| 23 | 1.5425 | 1.6625 | 48 | 14.5625 | 16.6875 |
| 24 | 1.6625 | 1.7875 | 49 | 16.6875 | 18.8750 |
| 25 | 1.7875 | 1.9250 | 50 | 18.8750 | 21.0620 |

TABLE II

Filter Coefficients

| Band x | $a_1(x)$ (dB) | $b_1(x)$ (dB) | $a_2(x)$ (dB) | $b_2(x)$ (dB) | Band x | $a_1(x)$ (dB) | $b_1(x)$ (dB) | $a_2(x)$ (dB) | $b_2(x)$ (dB) |
|---|---|---|---|---|---|---|---|---|---|
| 1 | 0.000 | −15.000 | −40.000 | −1.600 | 26 | 0.000 | −6.700 | −22.000 | −0.400 |
| 2 | 0.000 | −6.400 | −35.000 | −2.000 | 27 | 0.000 | −6.578 | −22.889 | 0.000 |
| 3 | 0.000 | −6.550 | −28.500 | −1.850 | 28 | 0.000 | −6.456 | −23.778 | 0.000 |
| 4 | 0.000 | −6.700 | −22.000 | −1.700 | 29 | 0.000 | −6.333 | −24.667 | 0.000 |
| 5 | 0.000 | −6.700 | −21.333 | −1.717 | 30 | 0.000 | −6.211 | −25.556 | 0.000 |
| 6 | 0.000 | −6.700 | −20.667 | −1.733 | 31 | 0.000 | −6.089 | −26.444 | 0.000 |
| 7 | 0.000 | −6.700 | −20.000 | −1.750 | 32 | 0.000 | −5.967 | −27.333 | 0.000 |
| 8 | 0.000 | −6.700 | −19.333 | −1.767 | 33 | 0.000 | −5.844 | −28.222 | 0.000 |
| 9 | 0.000 | −6.700 | −18.667 | −1.783 | 34 | 0.000 | −5.722 | −29.111 | 0.000 |
| 10 | 0.000 | −6.700 | −18.000 | −1.800 | 35 | 0.000 | −5.600 | −30.000 | 0.000 |
| 11 | 0.000 | −6.700 | −18.000 | −1.771 | 36 | 0.000 | −5.554 | −31.923 | 0.000 |
| 12 | 0.000 | −6.700 | −18.000 | −1.743 | 37 | 0.000 | −5.508 | −33.846 | 0.000 |
| 13 | 0.000 | −6.700 | −18.000 | −1.714 | 38 | 0.000 | −5.462 | −35.769 | 0.000 |
| 14 | 0.000 | −6.700 | −18.000 | −1.686 | 39 | 0.000 | −5.415 | −37.692 | 0.000 |
| 15 | 0.000 | −6.700 | −18.000 | −1.657 | 40 | 0.000 | −5.369 | −39.615 | 0.000 |
| 16 | 0.000 | −6.700 | −18.000 | −1.629 | 41 | 0.000 | −5.323 | −41.538 | 0.000 |
| 17 | 0.000 | −6.700 | −18.000 | −1.600 | 42 | 0.000 | −5.277 | −43.461 | 0.000 |
| 18 | 0.000 | −6.700 | −18.444 | −1.467 | 43 | 0.000 | −5.231 | −45.384 | 0.000 |
| 19 | 0.000 | −6.700 | −18.889 | −1.333 | 44 | 0.000 | −5.185 | −47.307 | 0.000 |
| 20 | 0.000 | −6.700 | −19.333 | −1.200 | 45 | 0.000 | −5.139 | −49.230 | 0.000 |
| 21 | 0.000 | −6.700 | −19.778 | −1.067 | 46 | 0.000 | −5.092 | −51.153 | 0.000 |
| 22 | 0.000 | −6.700 | −20.222 | −0.933 | 47 | 0.000 | −5.046 | −53.076 | 0.000 |
| 23 | 0.000 | −6.700 | −20.667 | −0.800 | 48 | 0.000 | −5.000 | −54.999 | 0.000 |
| 24 | 0.000 | −6.700 | −21.111 | −0.667 | 49 | 0.000 | −5.000 | −55.000 | 0.000 |
| 25 | 0.000 | −6.700 | −21.556 | −0.533 | 50 | 0.000 | −5.000 | −55.000 | 0.000 |

TABLE III

Allocation Lookup Table

| Required SNR (dB) | Quantizing Levels |
|---|---|
| 0.00 | 0 |
| 8.21 | 3 |
| 11.62 | 5 |
| 15.09 | 7 |
| 21.49 | 15 |
| 27.75 | 31 |
| 34.01 | 64 |
| 39.99 | 128 |
| 46.16 | 256 |
| 52.12 | 512 |
| 58.19 | 1,024 |
| 64.14 | 2,048 |
| 70.11 | 4,096 |
| 76.23 | 8,192 |
| 82.21 | 16,384 |
| 88.11 | 32,768 |
| 94.32 | 65,536 |

We claim:

1. An encoder of an input signal comprising
   subband means for generating subband signals representing frequency subbands of said input signal,
   excitation means for generating a spectral representation of said input signal and for generating an excitation pattern by applying one or more infinite impulse response filters to said spectral representation,
   threshold means for establishing a masking threshold in response to said excitation pattern,
   allocation means for allocating respective numbers of bits to said subband signals in accordance with levels of said subband signals relative to said masking threshold,
   quantization means for generating quantized information by quantizing said subband signals in accordance with said respective numbers of bits allocated to said subband signals, and
   format means for assembling said quantized information into an encoded signal suitable for transmission or storage.

2. An encoder according to claim 1 further comprising means for obtaining an estimate of the power spectral density of said input signal, wherein said spectral representation is generated by applying a mapping function to said estimate of the power spectral density, said mapping function implemented as a lookup table of entries wherein a log-log function of bandwidth versus band frequency in the entries in said table is substantially linear between a first entry near the low-frequency end of said table and a second entry near the high-frequency end of said table.

3. An encoder according to claim 1 wherein at least one of said one or more filters has a number of zeroes which varies as a function of frequency.

4. An encoder according to claim 1 wherein at least one of said one or more filters has a number of zeroes which increases with increasing frequency of said spectral representation.

5. An encoder according to claim 1 wherein said allocation means comprises means for adjusting the level of said masking threshold such that a total number of allocated bits is substantially equal to a bit budget.

6. An encoder according to claim 1, 2, 3, 4 or 5 wherein said allocation means comprises means for establishing an initial threshold, wherein said masking threshold is established by adjusting the level of said initial masking threshold, means for establishing intermediate spectral components having levels exceeding said initial threshold but below said masking threshold, and intermediate allocation means for allocating respective numbers of bits to at least some of said intermediate spectral components.

7. An encoder according to claim 6 wherein said intermediate allocation means comprises means for restricting said allocating to those intermediate spectral components having frequencies within a range from the highest-frequency spectral component which exceeds said masking threshold up to an upper limit frequency and/or having levels which exceed an intermediate threshold between said initial threshold and said masking threshold.

8. An encoder according to claim 7 wherein said upper limit frequency is the upper limit of the input signal bandwidth.

9. An encoder according to claim 7 wherein said intermediate threshold is at most a constant amount below said masking threshold.

10. An encoding method of an input signal comprising the steps of generating subband signals representing frequency subbands of said input signal, generating a spectral representation of said input signal and generating an excitation pattern by applying one or more infinite impulse response filters to said spectral representation, establishing a masking threshold in response to said excitation pattern, allocating respective numbers of bits to said subband signals in accordance with levels of said subband signals relative to said masking threshold, generating quantized information by quantizing said subband signals in accordance with said respective numbers of bits allocated to said subband signals, and assembling said quantized information into an encoded signal suitable for transmission or storage.

11. An encoding method according to claim 10 further comprising obtaining an estimate of the power spectral density of said input signal, wherein said spectral representation is generated by applying a mapping function to said estimate of the power spectral density, said mapping function implemented as a lookup table of entries wherein a log-log function of bandwidth versus band frequency in the entries in said table is substantially linear between a first entry near the low-frequency end of said table and a second entry near the high-frequency end of said table.

12. An encoding method according to claim 10 wherein at least one of said one or more filters has a number of zeroes which varies as a function of frequency.

13. An encoding method according to claim 10 wherein at least one of said one or more filters has a number of zeroes which increases with increasing frequency of said spectral representation.

14. An encoding method according to claim 10 wherein said allocating comprises adjusting the level of said masking threshold such that a total number of allocated bits is substantially equal to a bit budget.

15. An encoding method according to claim 10, 11, 12, 13 or 14 wherein said allocating comprises establishing an initial threshold, wherein said masking threshold is established by adjusting the level of said initial masking threshold, establishing intermediate spectral components having levels exceeding said initial threshold but below said masking threshold, and allocating respective numbers of bits to at least some of said intermediate spectral components.

16. An encoding method according to claim 15 wherein said allocating respective numbers of bits to at least some of said intermediate spectral components comprises restricting said allocating to those intermediate spectral components having frequencies within a range from the highest-frequency spectral component which exceeds said masking threshold up to an upper limit frequency and/or having levels which exceed an intermediate threshold between said initial threshold and said masking threshold.

17. An encoding method according to claim 16 wherein said upper limit frequency is the upper limit of the input signal bandwidth.

18. An encoding method according to claim 16 wherein said intermediate threshold is at most a constant amount below said masking threshold.

19. A decoder for decoding an encoded representation of an input signal, said decoder comprising deformatting means for extracting from said encoded representation quantized subband information and for generating a spectral representation of said input signal, excitation means for generating an excitation pattern by applying one or more infinite impulse response filters to said spectral representation, threshold means for establishing a masking threshold in response to said excitation pattern, allocation means for allocating respective numbers of bits to said quantized subband information in accordance with levels of said quantized subband information relative to said masking threshold, dequantizing means for generating subband signals by dequantizing said quantized subband information in accordance with said respective numbers of bits, and inverse subband means responsive to said subband signals for generating a replica of said input signal.

20. A decoder according to claim 19 further comprising means for obtaining an estimate of the power spectral density of said input signal, wherein said spectral representation is generated by applying a mapping function to said estimate of the power spectral density, said mapping function implemented as a lookup table of entries wherein a log-log function of bandwidth versus band frequency in the entries in said table is substantially linear between a first entry near the low-frequency end of said table and a second entry near the high-frequency end of said table.

21. A decoder according to claim 19 wherein at least one of said one or more filters has a number of zeroes which varies as a function of frequency.

22. A decoder according to claim 19 wherein at least one of said one or more filters has a number of zeroes which increases with increasing frequency of said spectral representation.

23. A decoder according to claim 19 wherein said allocation means comprises means for adjusting the level of said masking threshold such that a total number of allocated bits is substantially equal to a bit budget.

24. A decoder according to any one of claims 19 through 23 wherein said allocation means comprises means for establishing an initial threshold, wherein said masking threshold is established by adjusting the level of said initial masking threshold, means for establishing intermediate spectral components having levels exceeding said initial threshold but below said masking threshold, and intermediate allocation means for allocating respective numbers of bits to at least some of said intermediate spectral components.

25. A decoder according to claim 24 wherein said intermediate allocation means comprises means for restricting said allocating to those intermediate spectral components having frequencies within a range from the highest-frequency spectral component which exceeds said masking threshold up to an upper limit frequency and/or having levels which exceed an intermediate threshold between said initial threshold and said masking threshold.

26. A decoder according to claim 25 wherein said upper limit frequency is the upper limit of the input signal bandwidth.

27. A decoder according to claim 25 wherein said intermediate threshold is at most a constant amount below said masking threshold.

28. A decoder according to claim 19 wherein said deformatting means comprises means for establishing in response to said encoded representation an initial threshold, wherein said allocation means comprises means for establishing intermediate spectral components having levels exceeding said initial masking threshold but below said masking threshold, and intermediate allocation means for allocating respective numbers of bits to at least some of said intermediate spectral components.

29. A decoder according to claim 28 wherein said intermediate allocation means comprises means for restricting said allocating to those intermediate spectral components having frequencies within a range from the highest-frequency spectral component which exceeds said masking threshold up to an upper limit frequency and/or having levels which exceed an intermediate threshold between said initial threshold and said masking threshold.

30. A decoder according to claim 29 wherein said upper limit frequency is the upper limit of the input signal bandwidth.

31. A decoder according to claim 29 wherein said intermediate threshold is at most a constant amount below said masking threshold.

32. A method for decoding an encoded representation of an input signal, said method comprising the steps of disassembling said encoded representation into quantized subband information and generating a spectral representation of said input signal, generating an excitation pattern by applying one or more infinite impulse response filters to said spectral representation, establishing a masking threshold in response to said excitation pattern, allocating respective numbers of bits to said quantized subband information in accordance with levels of said quantized subband information relative to said masking threshold, generating subband signals by dequantizing said quantized subband information in accordance with said respective numbers of bits, and generating a replica of said input signal in response to said subband signals.

33. A method according to claim 32 further comprising obtaining an estimate of the power spectral density of said input signal, wherein said spectral representation is generated by applying a mapping function to said estimate of the power spectral density, said mapping function implemented as a lookup table of entries wherein a log-log function of bandwidth versus band frequency in the entries in said table is substantially linear between a first entry near the low-frequency end of said table and a second entry near the high-frequency end of said table.

34. A method according to claim 32 wherein at least one of said one or more filters has a number of zeroes which varies as a function of frequency.

35. A method according to claim 32 wherein at least one of said one or more filters has a number of zeroes which increases with increasing frequency of said spectral representation.

36. A method according to claim 32 wherein said allocating comprises adjusting the level of said masking threshold such that a total number of allocated bits is substantially equal to a bit budget.

37. A method according to any one of claims 32 through 36 wherein said allocating comprises establishing an initial threshold, wherein said masking threshold is established by adjusting the level of said initial masking threshold, establishing intermediate spectral components having levels exceeding said initial threshold but below said masking threshold, and allocating respective numbers of bits to at least some of said intermediate spectral components.

38. A method according to claim 37 wherein said allocating respective numbers of bits to at least some of said intermediate spectral components comprises restricting said allocating to those intermediate spectral components having frequencies within a range from the highest-frequency spectral component which exceeds said masking threshold up to an upper limit frequency and/or having levels which exceed an intermediate threshold between said initial threshold and said masking threshold.

39. A method according to claim 38 wherein said upper limit frequency is the upper limit of the input signal bandwidth.

40. A method according to claim 38 wherein said intermediate threshold is at most a constant amount below said masking threshold.

41. A method according to claim 32 wherein said disassembling comprises establishing in response to said encoded representation an initial masking threshold, wherein said allocating comprises establishing intermediate spectral components having levels exceeding said initial masking threshold but below said adjusted masking threshold, and allocating respective numbers of bits to at least some of said intermediate spectral components.

42. A method according to claim 41 wherein said allocating respective numbers of bits to at least some of said intermediate spectral components comprises restricting said allocating to those intermediate spectral components having frequencies within a range from the highest-frequency spectral component which exceeds said masking threshold up to an upper limit frequency and/or having levels which exceed an intermediate threshold between said initial threshold and said masking threshold.

43. A method according to claim 42 wherein said upper limit frequency is the upper limit of the input signal bandwidth.

44. A method according to claim 42 wherein said intermediate threshold is at most a constant amount below said masking threshold.

* * * * *

UNITED STATES PATENT AND TRADEMARK OFFICE
CERTIFICATE OF CORRECTION

PATENT NO : 5,632,003
DATED : 05/20/97
INVENTOR(S): Grant A. Davidson, et al.

It is certified that error appears in the above-identified patent and that said Letters Patent are hereby corrected as shown below:

Column 15 line 25 of the patent, "Barb" should be -- Barks--.

Column 15 line 39 of the patent, insert -- 1 --.

Column 16 line 27 of the patent, "a2(x) and a2(x)" should be "a2(x) and b2(x)".

Column 17 line 15 of the patent, "z(x)" should be "Z(x)".

Figures 11 and 12 are replaced by the attached Figures 11 and 12.

Signed and Sealed this

Twenty-ninth Day of May, 2001

Attest:

NICHOLAS P. GODICI

Attesting Officer

Acting Director of the United States Patent and Trademark Office